(12) United States Patent
Ho

(10) Patent No.: US 9,009,292 B2
(45) Date of Patent: Apr. 14, 2015

(54) CONTEXT-BASED DATA PRE-FETCHING AND NOTIFICATION FOR MOBILE APPLICATIONS

(75) Inventor: Michael M. Ho, Danville, CA (US)

(73) Assignee: Sybase, Inc., Dublin, CA (US)

( * ) Notice: Subject to any disclaimer, the term of this patent is extended or adjusted under 35 U.S.C. 154(b) by 1188 days.

(21) Appl. No.: 12/180,649

(22) Filed: Jul. 28, 2008

(65) Prior Publication Data

US 2009/0036102 A1    Feb. 5, 2009

Related U.S. Application Data

(60) Provisional application No. 60/935,182, filed on Jul. 30, 2007.

(51) Int. Cl.
*G06F 15/173* (2006.01)
*H04L 29/08* (2006.01)

(52) U.S. Cl.
CPC .......... *H04L 67/2847* (2013.01); *H04L 67/306* (2013.01); *H04L 67/28* (2013.01)

(58) Field of Classification Search
CPC ............................ H04L 67/28; H04L 67/2847
USPC .................................. 709/217, 224; 718/108
See application file for complete search history.

(56) References Cited

U.S. PATENT DOCUMENTS

| | | | |
|---|---|---|---|
| 5,857,201 A | 1/1999 | Wright, Jr. et al. | |
| 6,018,762 A | 1/2000 | Brunson et al. | |
| 6,073,163 A | 6/2000 | Clark et al. | |
| 6,089,454 A | 7/2000 | Sadler | |
| 6,425,017 B1 | 7/2002 | Dievendorff et al. | |
| 6,449,657 B2 | 9/2002 | Stanbach, Jr. et al. | |

(Continued)

FOREIGN PATENT DOCUMENTS

| | | |
|---|---|---|
| EP | 1016987 A2 | 7/2000 |
| EP | 1271362 A2 | 1/2003 |
| WO | WO 99/30295 A1 | 6/1999 |

OTHER PUBLICATIONS

Bray, T. et al. (eds.), *Extensible Markup Language (XML) 1.0 (Second Edition)*, W3C Recommendation, 59 pages (Oct. 6, 2000).

(Continued)

*Primary Examiner* — Joseph E Avellino
*Assistant Examiner* — James Conaway
(74) *Attorney, Agent, or Firm* — Sterne, Kessler, Goldstein & Fox P.L.L.C.

(57) ABSTRACT

Methods, systems, and computer program products for context-based data pre-fetching and notification for applications are described herein. In an embodiment, the method operates by creating a context model that includes context variables and events. The method populates context variables based upon the context of an application and instantiates a context based upon the context model. The method determines whether the context is active or inactive and infers a likely set of data needed by the application. The method executes a data selection function to generate a dataset for the application. In an embodiment, the system includes a module to create and maintain a context model. The system includes modules to: populate context variables within the context model; calculate a dataset for the application; maintain an inference engine; subscribe to changes in the context variables; and generate notifications including a dataset with associated metadata that assists with display of the dataset.

32 Claims, 10 Drawing Sheets

(56) References Cited

U.S. PATENT DOCUMENTS

| | | | |
|---|---|---|---|
| 6,477,565 B1 | 11/2002 | Daswani et al. | |
| 6,539,381 B1 | 3/2003 | Prasad et al. | |
| 6,567,864 B1 | 5/2003 | Klein | |
| 6,584,548 B1 | 6/2003 | Bourne et al. | |
| 6,636,873 B1 | 10/2003 | Carini et al. | |
| 6,636,886 B1 | 10/2003 | Katiyar et al. | |
| 6,728,702 B1 | 4/2004 | Subramaniam et al. | |
| 6,769,032 B1 | 7/2004 | Katiyar et al. | |
| 6,792,046 B2 | 9/2004 | Hatano et al. | |
| 6,820,116 B1 | 11/2004 | Phyalammi et al. | |
| 6,842,906 B1 | 1/2005 | Bowman-Amuah | |
| 6,920,480 B2 | 7/2005 | Mitchell et al. | |
| 6,944,662 B2 | 9/2005 | Devine et al. | |
| 6,952,772 B2 | 10/2005 | Deo et al. | |
| 6,954,751 B2 | 10/2005 | Christfort et al. | |
| 6,959,436 B2 | 10/2005 | Peng | |
| 6,968,181 B2 | 11/2005 | Ishidoshiro | |
| 7,055,042 B1 | 5/2006 | Gough et al. | |
| 7,127,467 B2 | 10/2006 | Yalamanchi et al. | |
| 7,177,859 B2 | 2/2007 | Pather et al. | |
| 7,181,489 B2 | 2/2007 | Lection et al. | |
| 7,266,826 B2 | 9/2007 | Katiyar et al. | |
| 7,360,202 B1 | 4/2008 | Seshadri et al. | |
| 7,444,344 B2 | 10/2008 | Galindo-Legaria et al. | |
| 7,467,389 B2 | 12/2008 | Mukkamala et al. | |
| 7,487,186 B2 | 2/2009 | Shimshoni | |
| 7,509,304 B1 | 3/2009 | Pather et al. | |
| 7,519,564 B2 * | 4/2009 | Horvitz | 706/12 |
| 7,739,232 B2 | 6/2010 | Ireland | |
| 7,752,165 B2 | 7/2010 | Ireland et al. | |
| 2002/0056011 A1 | 5/2002 | Nardone et al. | |
| 2002/0065946 A1 | 5/2002 | Narayan | |
| 2002/0087649 A1 * | 7/2002 | Horvitz | 709/207 |
| 2002/0095491 A1 | 7/2002 | Edmonds et al. | |
| 2002/0099595 A1 | 7/2002 | Kelly et al. | |
| 2002/0116405 A1 | 8/2002 | Bodnar et al. | |
| 2002/0133508 A1 | 9/2002 | LaRue et al. | |
| 2003/0046433 A1 | 3/2003 | Luzzatti et al. | |
| 2003/0061365 A1 | 3/2003 | White et al. | |
| 2003/0069922 A1 | 4/2003 | Arunachalam | |
| 2003/0131051 A1 | 7/2003 | Lection et al. | |
| 2003/0131073 A1 | 7/2003 | Lucovsky et al. | |
| 2003/0137536 A1 | 7/2003 | Hugh | |
| 2003/0148773 A1 | 8/2003 | Spriestersbach et al. | |
| 2003/0187984 A1 | 10/2003 | Banavar et al. | |
| 2003/0212670 A1 | 11/2003 | Yalamanchi et al. | |
| 2004/0002972 A1 | 1/2004 | Pather et al. | |
| 2004/0002988 A1 | 1/2004 | Seshadri et al. | |
| 2004/0064502 A1 | 4/2004 | Yellepeddy et al. | |
| 2004/0098754 A1 | 5/2004 | Vella et al. | |
| 2004/0109436 A1 | 6/2004 | Vargas et al. | |
| 2004/0122907 A1 | 6/2004 | Chou et al. | |
| 2004/0128327 A1 | 7/2004 | Shi et al. | |
| 2004/0152450 A1 | 8/2004 | Kouznetsov et al. | |
| 2004/0158577 A1 | 8/2004 | Chu et al. | |
| 2004/0193608 A1 | 9/2004 | Gollapudi et al. | |
| 2004/0255164 A1 | 12/2004 | Wesemann | |
| 2005/0144293 A1 | 6/2005 | Limont et al. | |
| 2005/0160434 A1 | 7/2005 | Tan et al. | |
| 2005/0169213 A1 | 8/2005 | Scian et al. | |
| 2005/0182773 A1 | 8/2005 | Feinsmith | |
| 2005/0216639 A1 | 9/2005 | Sparer et al. | |
| 2005/0232263 A1 | 10/2005 | Sagara | |
| 2006/0004540 A1 * | 1/2006 | Hamilton et al. | 702/176 |
| 2006/0026168 A1 | 2/2006 | Bosworth et al. | |
| 2006/0047742 A1 | 3/2006 | O'Neill et al. | |
| 2006/0062356 A1 | 3/2006 | Vendrow et al. | |
| 2006/0143646 A1 * | 6/2006 | Wu et al. | 725/10 |
| 2007/0112511 A1 | 5/2007 | Burfeind et al. | |
| 2007/0156656 A1 | 7/2007 | Pather et al. | |
| 2007/0190978 A1 | 8/2007 | White et al. | |
| 2008/0189439 A1 * | 8/2008 | Chitre et al. | 709/248 |
| 2009/0037430 A1 * | 2/2009 | Mukkamala et al. | 707/10 |
| 2009/0215504 A1 * | 8/2009 | Lando | 455/574 |
| 2009/0248612 A1 * | 10/2009 | Morris | 707/1 |
| 2013/0110903 A1 * | 5/2013 | Myerscough et al. | 709/203 |

OTHER PUBLICATIONS

Christensen, E. et al., *Web Services Description Language (WSDL) 1.1*, W3C Note, 31 pages (Mar. 15, 2001).

Eddon, G., "COM+: The Evolution of Component Services," *Computer*, IEEE Computer Society, pp. 104-106 (Jul. 1999).

Ellis, J. and Ho, L., *JDBC 3.0™ Specification Final Release*, Chapters 1-5, pp. v-35, Sun Microsystems, Inc., Mountain View, CA (Oct. 2001).

Fielding, R. et al., *RFC2616: Hypertext Transfer Protocol—HTTP/1.1*, Network Working Group, 176 pages (Jun. 1999).

Gosling, J. and McGilton, H., *The Java™ Language Environment: A White Paper*, Sun Microsystems, pp. i-95 (May 1996).

Gudgin, M. et al. (eds.), *SOAP Version 1.2 Part 1: Messaging Framework*, W3C Recommendation, 52 pages (Jun. 24, 2003).

Gudgin, M. et al. (eds.), *SOAP Version 1.2 Part 2: Adjuncts*, W3C Recommendation, 25 pages (Jun. 24, 2003).

Helal, A. et al., *Replication Techniques in Distributed Systems*, Boston, MA: Kluwer Academic Publishers, ISBN No. 9780306477966, pp. 73-94 (2002).

Leff, A. and Rayfield, J., "Programming Model Alternatives for Disconnected Business Applications," *IEEE Internet Computing*, IEEE Computer Society, pp. 50-57 (May-Jun. 2006).

Search Report and Written Opinion, dated Sep. 25, 2008, for PCT Application No. PCT/US08/07175, 10 pages.

Search Report and Written Opinion, dated Aug. 28, 2008, for PCT Application No. PCT/US08/07757, 10 pages.

Search Report and Written Opinion, dated Oct. 29, 2008, for PCT Application No. PCT/US08/08117, 9 pages.

Shannon, B., *Java™ 2 Platform Enterprise Edition Specification, v1.4 Final Release*, Sun Microsystems, Inc., Mountain View, CA, pp. i-232 (Nov. 24, 2003).

Socolofsky, T. and Kale, C., *RFC1180: A TCP/IP Tutorial*, Spider Systems Limited, 28 pages (Jan. 1991).

Srinivasan, R., *RFC1831: RPC: Remote Procedure Call Protocol Specification Version 2*, Sun Microsystems, 18 pages (Aug. 1995).

Gebauer, J. and Shaw, M.J., "Success Factors and Impacts of Mobil Business Applications: Results From a Mobile E-Procurement Study," *International Journal of Electronics Commerce*, 8, 3 (2004); last updated Dec. 29, 2003, 28 pages.

Search Report and Written Opinion, dated Nov. 4, 2008, for PCT Patent Application No. PCT/US2008/009130, 10 pages.

\* cited by examiner

FIG. 3 Life cycle of Context Model within the Context Server

Context Model Development

Data Selection Function within a subscriber

Pre-Fetching

CONTEXT-BASED DATA PRE-FETCHING AND NOTIFICATION FOR MOBILE APPLICATIONS

CROSS REFERENCE TO RELATED APPLICATIONS

This application claims the benefit of U.S. Provisional Application No. 60/935,182, filed Jul. 30, 2007, and entitled "System, Method, and Computer Program Product for Context-Based Data Pre-Fetching and Notification for Mobile Applications," which is herein incorporated by reference in its entirety.

BACKGROUND OF THE INVENTION

1. Field of the Invention

The present invention generally relates to mobile computing and, more particularly, to optimization of delivery of data to mobile applications.

2. Background

As mobile computing platforms become increasingly ubiquitous, and with the availability of network access for the mobile computing platforms, it becomes desirable to provide users with as close an approximation to the experience of a full-featured computing platform as possible. In order to conserve space and battery power, mobile computing platforms, such as personal digital assistants (PDAs), frequently have small display screens, limited memory, limited processing power, and limited communications bandwidth. Such resource restrictions of mobile computing platforms are often incompatible with the goal of providing users with data needed by the users to enjoy a full-featured experience.

Mobile applications require data to be mobilized from the enterprise and stored on a mobile device for occasionally disconnected computing while the device is not connected to the enterprise network. However, as the mobile devices are often resource restricted, the set of data downloaded to the devices is limited to a subset of what is available on enterprise servers and devices. In addition, the subset of enterprise data needed on mobile devices must be determined a priori. At times, the pre-determined subset of data is insufficient to meet the mobile user's needs. Necessary data is unavailable on mobile devices when unplanned and planned changes are not accounted for. Without necessary data available at the mobile devices, corresponding mobile applications can be rendered difficult to use or inoperable, depending on network connectivity.

In traditional enterprise computing environments, users are able to request data (i.e., fetch data and query databases) when it is needed and receive a timely response with the subset of data they have requested. In the mobile environment, this traditional request/response paradigm does not always work due to potential connectivity problems of 'roaming' mobile devices. The attention of a mobile user using a particular mobile application is on the task currently being performed so it is unreasonable to expect mobile users or applications to determine what data is necessary to complete the task. Hence, pertinent information should be 'pushed' to the mobile user's applications rather than requiring mobile devices to 'pull' the information from enterprise servers. Relevant data and notifications must be provided at the appropriate time to mobile devices enabling mobile users to make time sensitive business decisions. This is because mobile users oftentimes do not know when and what subset of data is needed as they are not aware of the situation or 'context' they are currently in.

Accordingly, what is desired is a system, method, and computer program product to dynamically determine the likely set of data needed on a mobile computing platform based on the context of the mobile applications on the platform and the user using the platform.

What is further needed is a system, method, and computer program product to provide relevant data and notifications at the appropriate time to a mobile computing platform based on the context of the mobile applications on the platform.

BRIEF SUMMARY OF THE INVENTION

An embodiment of the invention includes a computer-implemented method for determining the likely set of data needed on a mobile computing device based on the context of the mobile device, wherein the context reflects the context of the device's user within an enterprise as well as that of the device. Besides a human user who needs data on a mobile computing device, a software application or agent sometimes needs data. Accordingly, unless specifically stated, the "user" as used herein is not necessarily limited to and does not necessarily pertain to a human being. In accordance with an embodiment of the present invention, the context of a mobile device takes into account one or more of device-specific variables such as the device's GPS location, current data contents, network connectivity, and battery status. It should, however, be understood that the invention is not limited to these device-specific variables and other variables related to the mobile platform's status may be used. The context of a mobile device is also affected by the status of a user using the device. A mobile user's status or context takes into account one or more user-specific variables such as the user's schedule, access privileges, security role(s), group memberships, database roles, and data privileges granted, in accordance with an embodiment of the present invention. It should, however, be understood that the invention is not limited to these user-specific variables and other variables related to the mobile user's status may be used. According to an embodiment of the invention, the method includes the steps of creating a context model wherein the context model represents the situational information of a mobile user; updating context variables within the context model that can be used by the mobile application wherein multiple applications can share a single context model as well as having a specific context model for each application; determining the set of data for the mobile application through the use of the context variables from the context model; maintaining inference engines used by the data selection functions to arrive at the likely set of data needed by a mobile application; maintaining the context models; subscribing to changes in context variables for mobile user/device combinations; and executing data selection functions to calculate a dataset for applications, including applications running on mobile devices.

The invention further includes a computer program product embodiment comprising a computer usable medium having computer program logic recorded thereon for enabling a processor to perform context-based data pre-fetching and notification for mobile applications, in accordance with an embodiment of the present invention. The computer program logic includes a first context modeling means for creating a context model wherein the context model represents the combined situational information of a mobile device and its user. The computer program logic includes a means for updating and maintaining context variables within the context model that can be utilized by mobile applications executing on the mobile device wherein multiple applications can share a single context model. In an alternative embodiment, each mobile application can have its own respective, specific context model. The computer program logic further includes a means for determining the set of data for the mobile application that will leverage the context variables from the context model. The computer program logic also includes a means for maintaining inference engines used by the data selection functions to arrive at the likely set of data needed by a mobile application. The computer program logic includes a subscribing means for subscribing to changes in context variables for mobile user/device combinations. The computer program logic includes a data selection means for executing data selection functions to calculate a dataset for mobile applications.

The invention additionally includes a system capable of context-based data pre-fetching and notification for mobile applications, in accordance with an embodiment of the present invention. The system includes a first context modeling module configured to create a context model wherein the context model represents the combined situational information of a mobile device and its user. The system includes a context variable module configured to update and maintain context variables within the context model, wherein the context model can be used by the mobile application and multiple applications can share a single context model as well as having a specific context model for each application. The system further includes a data selection module configured to determine the set of data for the mobile application that will leverage the context variables from the context model. The system includes an inference module configured to maintain an inference engine used by the data selection function to arrive at the likely set of data needed by a mobile application. The system also includes a context server module configured to maintain the context models. The system further includes an event engine module configured to subscribe to changes in context variables for mobile user/device combinations and executes data selection functions to calculate a dataset for mobile applications.

Further features and advantages of the invention, as well as the structure and operation of various embodiments of the invention, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form part of the specification, illustrate the present invention and, together with the description, further serve to explain the principles of the invention and to enable a person skilled in the relevant art(s) to make and use the invention.

Figure 8:
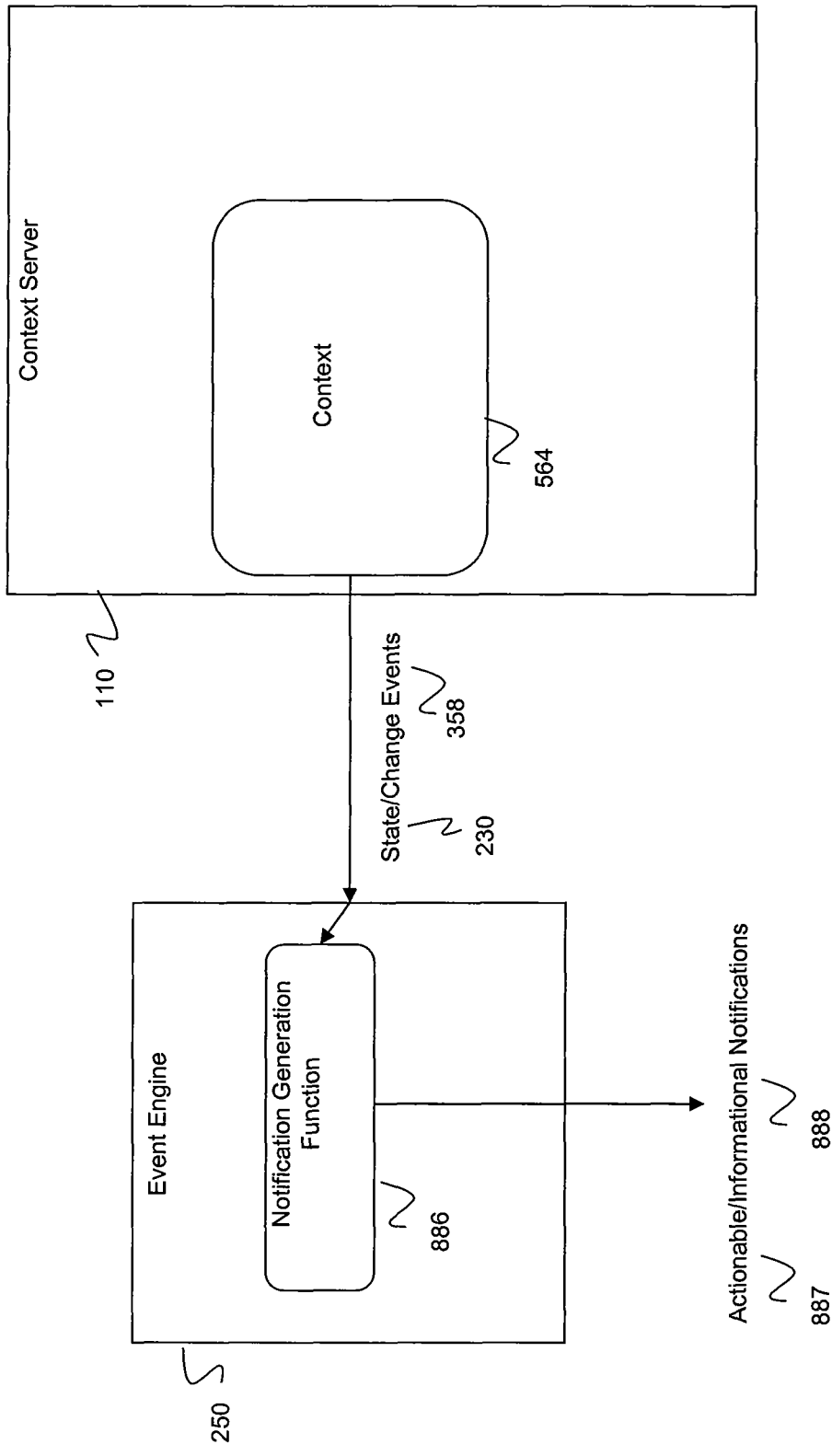

FIG. 8 notification generation for mobile applications, in accordance with an embodiment of the present invention.

Figure 9:
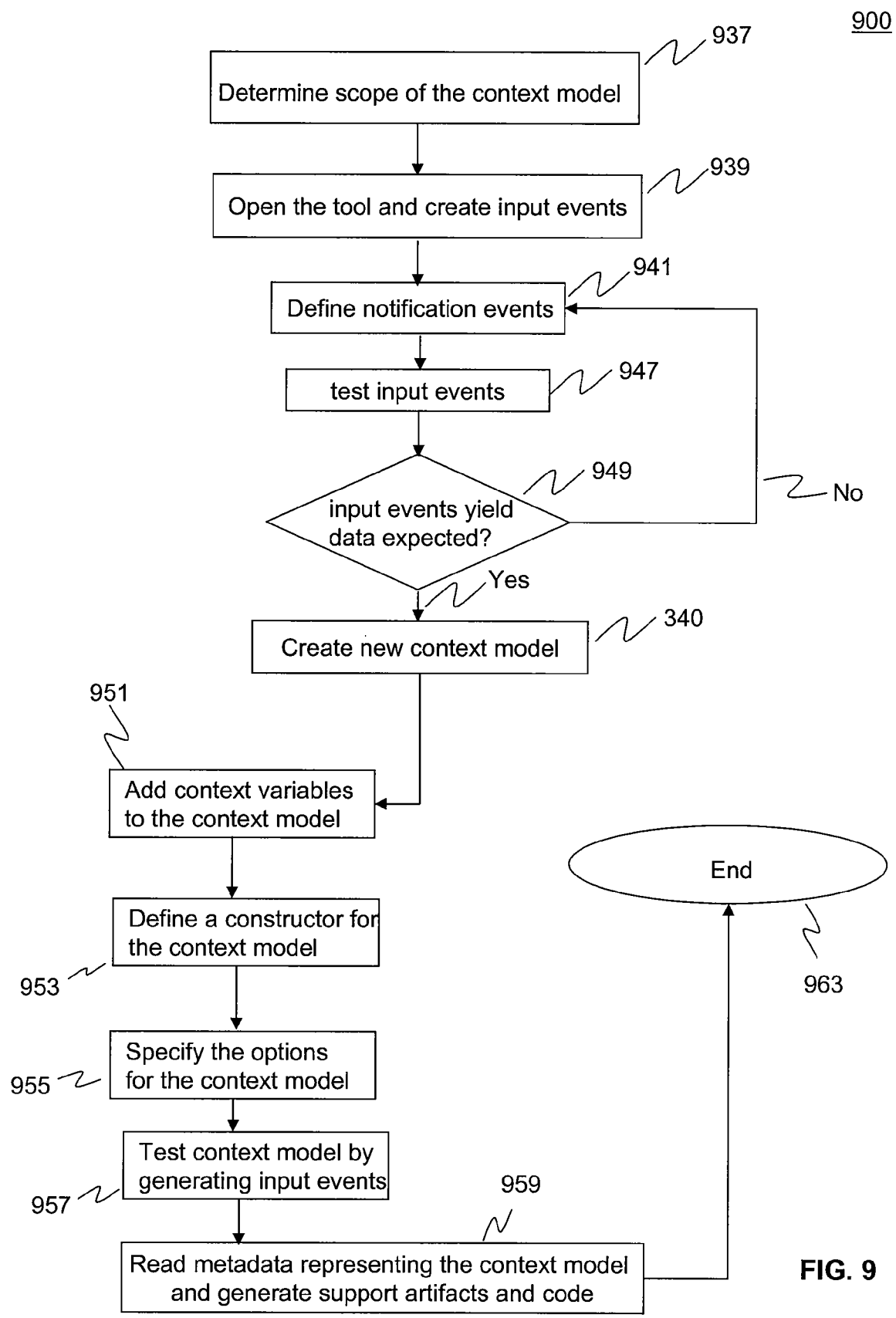

FIG. 9 is a flowchart representing a method for context-based data pre-fetching and notification for mobile applications, according to an embodiment of the invention.

Figure 10:
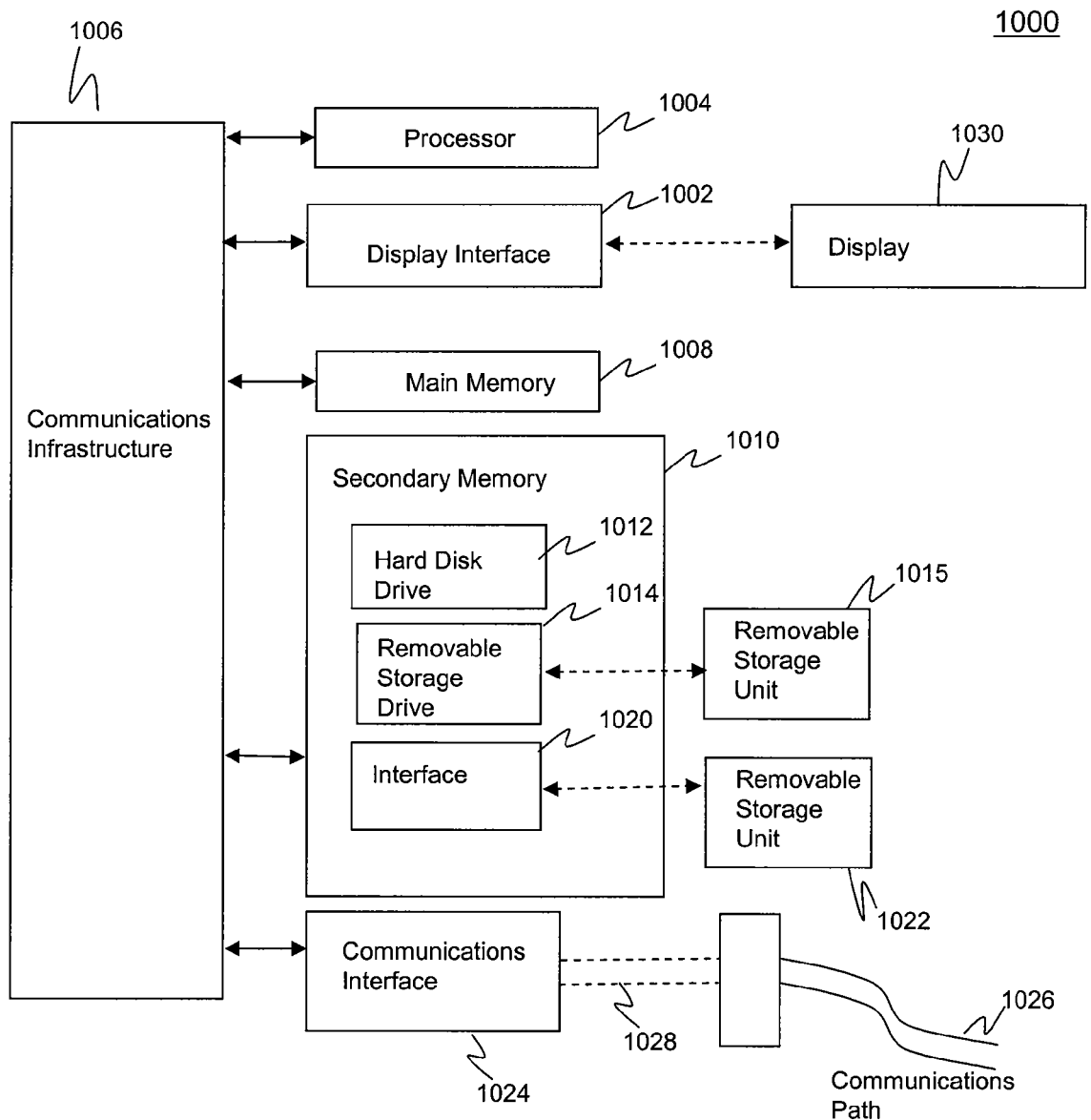

FIG. 10 depicts an example computer system in which the present invention may be implemented.

The features and advantages of the present invention will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION OF THE INVENTION

Overview

The increasing availability of wireless access to the Internet has created a significant market for mobile computing devices with wireless access capabilities. Traditionally, such compact portable computing devices, commonly termed hand-held devices or PDAs, have had less computational power than larger computing platforms, such as laptops or personal computers (PCs). Due to this limited computing power, as well as other features inherent to a mobile computing platform such as smaller display screens, custom mobile applications have been developed for purposes such as optimizing the display of web pages, reducing CPU usage, reducing local data storage, reducing the quantity of network accesses, and increasing battery life.

Of particular concern to the present invention is the reduction of network accesses by decreasing the amount and frequency of data fetching by mobile applications, among other features. One skilled in the relevant arts will appreciate that, accordingly, the techniques described herein need not be limited to a portable computing device, but can in fact be used in any computing situation where similar resource utilization problems are posed.

1.0 Example Network Implementation

Figure 1:
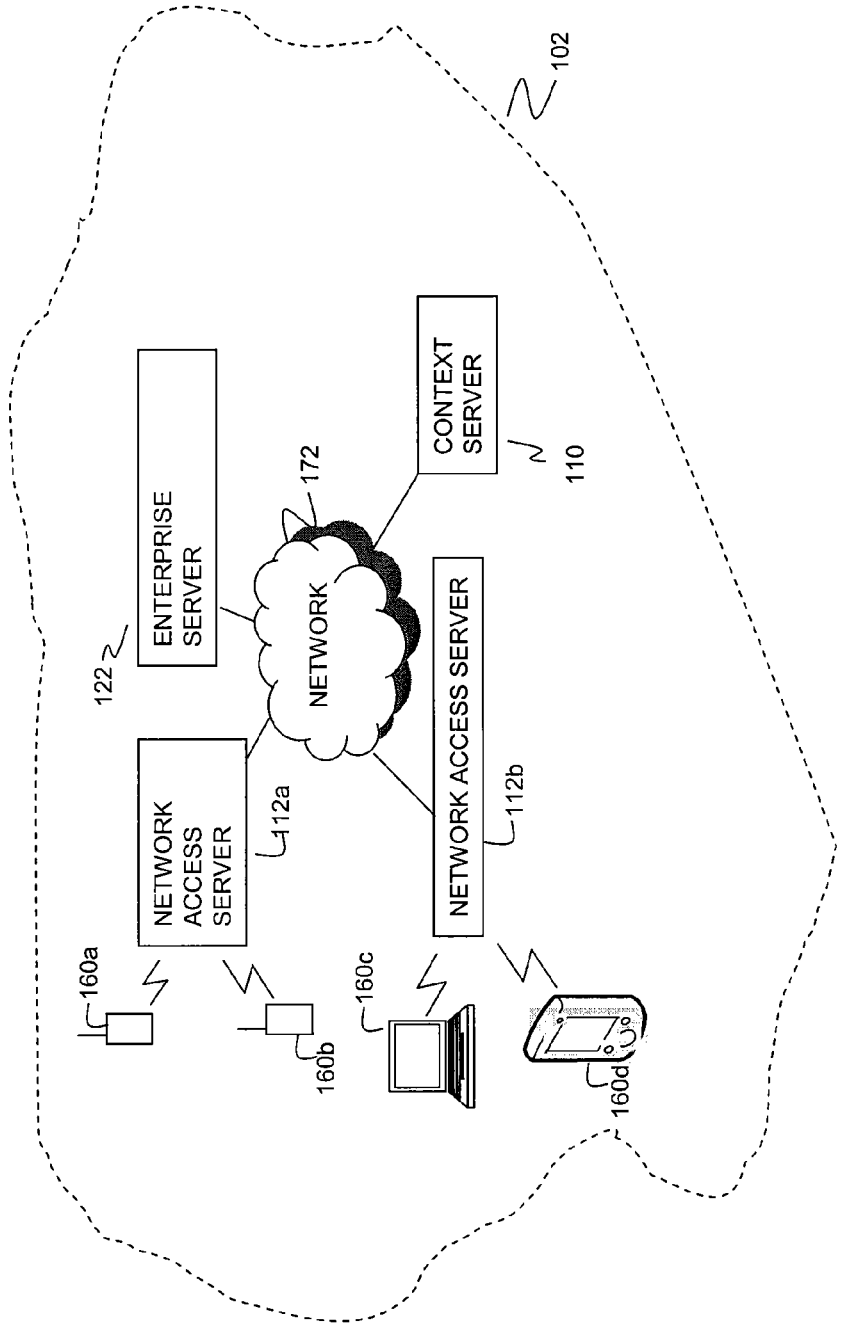
FIG. 1 illustrates a network environment for context-based data pre-fetching and notification for mobile computing devices, in accordance with an embodiment of the present invention.

FIG. 1 illustrates a wireless network environment 100 for delivering pre-fetched data to applications executing on mobile devices 160a-d, in accordance with an embodiment of the present invention. Mobile devices 160a-d may be one of many devices commonly designated as mobile computing platforms or personal digital assistants (PDAs), such as but not limited to, devices operating according to the Microsoft Pocket PC specification with the Microsoft Windows® CE operating system (OS), devices running the Symbian OS, devices running the Palm® OS, iPhones®, mobile phones, BlackBerry® devices, smart phones, hand held computers, palmtop computers, laptop computers, ultra-mobile PCs, and other wireless mobile devices capable of running mobile applications. Mobile devices 160a-d may further encompass other wireless mobile computational devices or other data processing devices with any similar resource limitations as PDAs.

Mobile device 160a is connected to the Internet 102 through a gateway network access server 112a. Mobile device 160a connects to enterprise server 122 via network 172. One skilled in the relevant art(s) will appreciate that any network, such as, but not limited to a corporate intranet, may be used instead of the Internet 102. Furthermore, gateway network access server 112a is operable to support connections from multiple mobile devices such as mobile devices 160a and 160b. Additional mobile devices 160c and 160d may connect to network 172 via another network access server 112b to receive data from an enterprise via enterprise server 122. In accordance with an embodiment of the present invention, pre-fetched data from enterprise server 122 is delivered to mobile devices 160a-d via network 172 based upon one or more context models stored on context server 110. The context models may be shared amongst multiple mobile devices 160 or each device may have their own respective context models. In an embodiment, context server 110 maintains context models by polling for updates from physical sensors in wireless network environment 100. Context server 110 also maintains context models by receiving updates to context variables residing on context server 110. The values of context variables on context server 110 vary depending on the respective applications running on mobile devices 160 and the characteristics of users using mobile devices 160.

2.0 Context-Based Pre-Fetching

Figure 2:
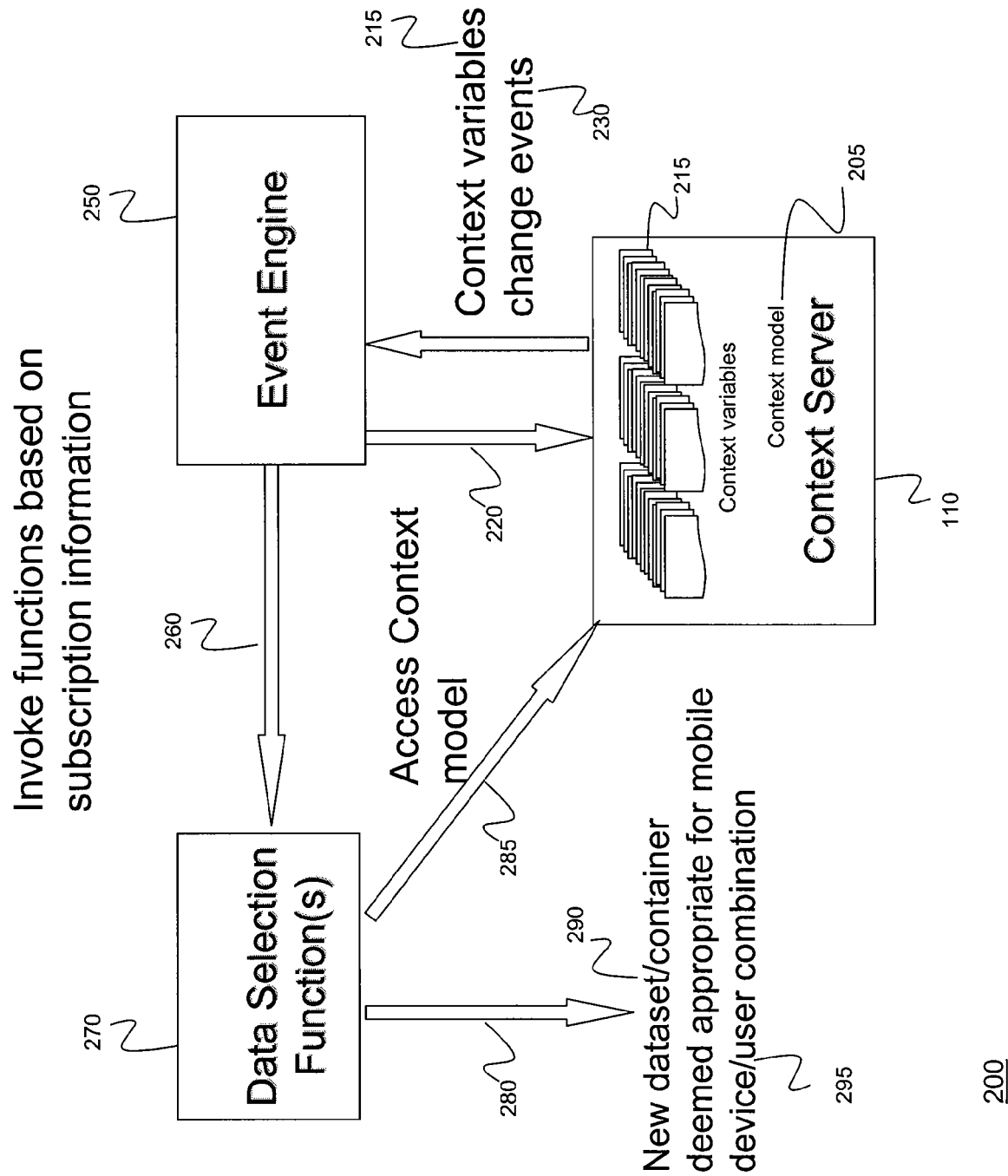
FIG. 2 illustrates the operation of context-based data pre-fetching and notification for mobile applications, in accordance with an embodiment of the present invention.

FIG. 2 illustrates context-based data pre-fetching and notification 200 for applications running on mobile devices, in accordance with an embodiment of the present invention.

Context model 205 represents the situational information of the mobile user. According to an embodiment, context model 205 may be defined using ontology. The ontology can be as simple as key-value pairs. Ontology can be leveraged in context model 205. Each context model 205 has a set of concepts as well as the relationships between them, expressed in context variables 215. Context model 205 is a template used to enable context-based data pre-fetching.

Context variables 215 can be simple, derived, or contextual. Derived variables are by obtained by aggregating through inferences of simple variables. Context variables 215 may include simple context variables which in turn may contain a single value or a collection of values.

In order to facilitate delta-based data updating (i.e., sending out only information and data that a mobile device 160 does not already have), context model 205 stores a representation of what is already on mobile device 160 in one or more context variables 215. Context variables 215 are part of context model 205.

There can be many context models 205 within context server 110. Context server 110 maintains context models 205 by polling or receiving updates from physical sensors or software-based information for simple variables. Changes in the simple variables trigger inference to update corresponding derived variables.

Context server 110 provides a context query API to access context variables 215 within context model 205. According to an embodiment, a context is identified by a globally unique identifier (GUID). Context Server 110 is responsible for the lifecycle of all contexts within it. According to embodiments of the present invention, context server 110 may be a software module, computer hardware, or a combination of hardware and software. A context is created based on a context model. In other words, a context model can be compared to a Java class whereas the context itself is akin to a Java object corresponding to the Java class or an instance of the Java class.

Data selection functions 270 are functions that calculate the pre-fetch data for applications running on mobile devices 160. Data selection functions 270 may leverage context variables 215 within context model 205. For each mobile user/device combination 295, there can be a set of data selection functions 270. The output of each function is combined to form new dataset 290. Data selection functions 270 may use inference (e.g. rules or Bayesian network) to perform calculate the dataset 290 required by each mobile user/device combination 295. Data selection functions 270 also access context model 205 from context server 110.

In accordance with an embodiment of the invention, Data selection functions 270 access context model 205 that represents the mobile user's context to determine the new dataset 290 required by each mobile user/device combination 295.

Each user/device combination 295 may subscribe to a set of context variables 215 within context model 205. Whenever context variables 215 within subscription 220 changes, event engine 250 will determine and execute the affected sets of data selection functions 270. The new dataset 290 created by the functions will be compared with what is already on the device, stored as context variables 215, to create a 'delta' set of data 280 that the mobile user/device combination 295 does not already have.

Event engine 250 is also responsible for receiving notifications/updates 220 from sensors and software event mediator and forwards them to context server 110 to maintain context models 205.

FIG. 2 also illustrates a method for delivering relevant data and notification at the appropriate times to applications running on mobile devices 160 using context-based pre-fetching method described above, in accordance with an embodiment of the present invention.

According to one embodiment of the present invention, notifications and data 280 delivered to mobile user/device combination 295 have the following characteristics.

Dataset 290 is packaged with metadata into a 'metadata driven container' to assist in displaying the data at the mobile device and the metadata contains a description of data 280.

Dataset 290 has an identifier with a timestamp, thus dataset 290 is named and versioned.

All versions of dataset 290 with the same identifier are unique.

Policies on mobile device 160 support having only one or multiple versions of dataset 290 per identifier.

No modification of dataset 290 is allowed, and data 280 is provided to mobile user/device combination 295 only for reference.

Dataset 290 includes both structured and unstructured data.

Dataset 290 requires a client side container to interpret the dataset 'package' and display it appropriately at mobile device 160.

Dataset 290 can be acknowledged and discarded by mobile device 160 or after a predetermined time (i.e., a 'timeout period') according to a policy on mobile device 160.

Data 280 is generated from mobile device/user combination 295 specified data selection functions 270 that are subscribed to context variables 215 within context model 205.

The metadata driven dataset/container 290 uses the metadata within the dataset 290 to determine how best to display the data 280. Data container 290 is context aware (i.e., aware of the environment that it is executed under such as the characteristics of mobile device/user combination 295). Hence, data container 290 can render data 280 in a fashion that is most suitable for the device.

When data 280 is reviewed by user 295, it can be deleted from the mobile device 160. In addition, if dataset 290 has an expiration date set, it will be discarded when appropriate.

Relevant data 280 can be pushed to mobile device/user combination 295 based upon changes in the context 260 that the data selection functions 270 subscribed to.

Changes in a context are expressed as change events 230 (context variables 215 within context model 205) and can be caused by changes occurring within the enterprise such as changes in data on enterprise server 122, execution of business processes, or other change events 230. Change events 230 are reported to event engine 250 which notifies context Server 110 to update the corresponding context model 205.

Change events 230 can also be caused by a mobile device/user combination 295 triggering a change in context through user actions within applications running on mobile device 160, natural language commands/queries through messaging or short messaging service (SMS), and device sensor readings.

Context model 205 may also contain a constructor and the set of parameters required to create a context based on it. At a minimum, the identifier of the to-be created context must be specified. This is because all created contexts must have a globally unique identifier for us to unambiguously refer to it. For example, a GUID may be used to uniquely identify a context. Additional parameters to the constructor can be used to set some of the context variables within the newly created context.

Context model 205 defines a type of context for a particular usage. For example, a context model can be tailored and populated for a Customer Relationship Management (CRM) application for pharmaceutical sales personnel using mobile devices 160. Each context model 205 consists of a set of context variables that define the domain of interest or set of situations that the context can express. For example, a work context model can have two variables: at-office, on-vacation. According to one embodiment of the present invention, the valid states of context model 205 can include, but are not limited to, the permutations listed and described in Table 1 below.

TABLE 1

Example Context Model States

| At Office | On Vacation | Description |
| --- | --- | --- |
| True | False | In the office and not on vacation |
| False | False | Away from the office and not on vacation (i.e., on business travel, attending off-site meetings, conferences, et al). |
| False | True | Away from the office and on vacation. |
| True | True | The employee is in the office and at work even though he is on vacation. |

2.1 Context Lifecycle

Figure 3:
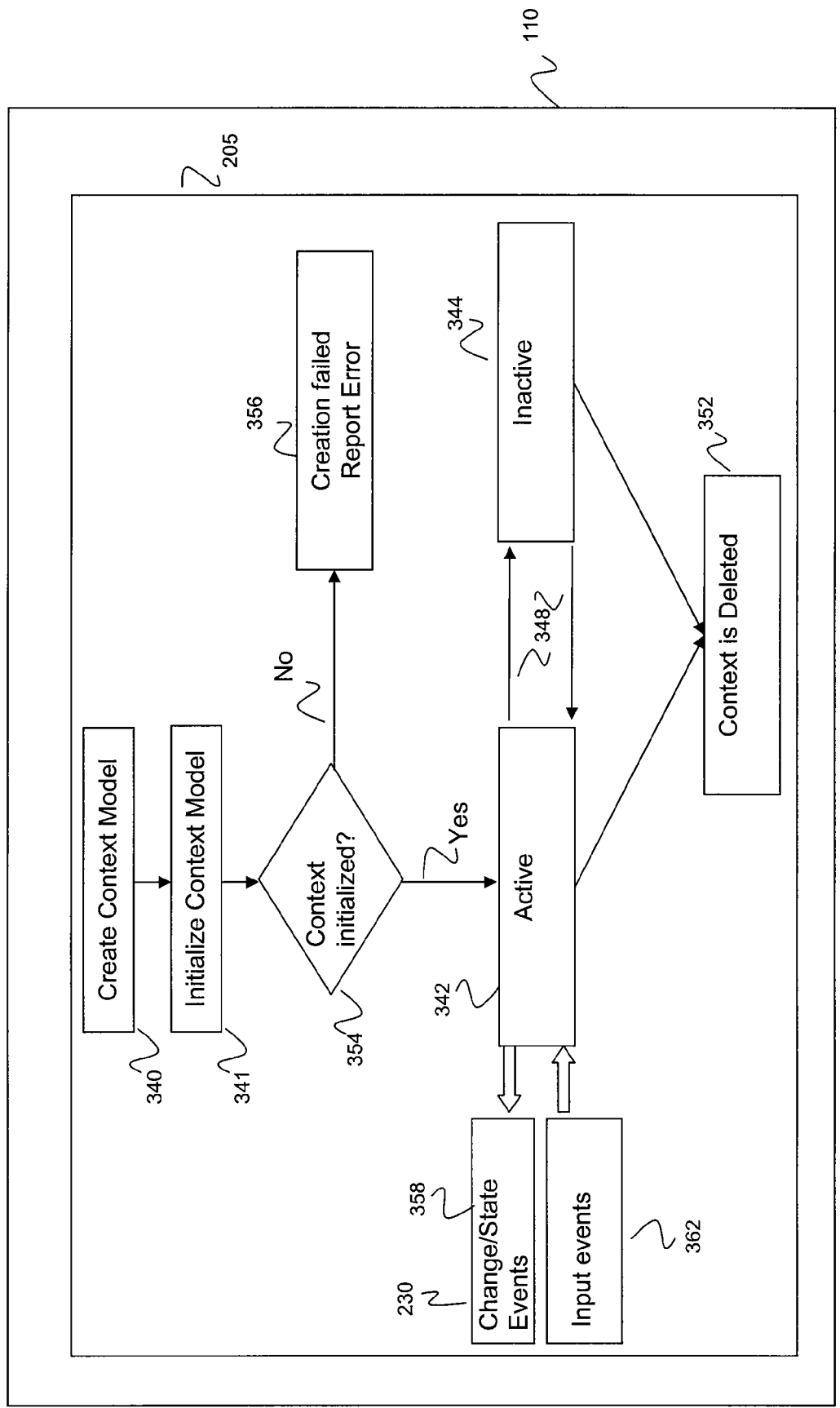
FIG. 3 depicts the life cycle of a context model within a context server, in accordance with an embodiment of the present invention.

FIG. 3 illustrates the steps of life cycle 300 of context model 205 within context server 110, in accordance with an embodiment of the present invention. The lifecycle of a context includes the following states: created, active, inactive, and deleted. When in 'Inactive' state, the context will not be updated.

A context is created during runtime using the metadata within context model 205. In an embodiment, all contexts reside within context server 110 which serves as their container. Context server 110 is responsible for managing the lifecycle 300 of the contexts within it. All contexts within context server 110 have unique identifiers associated with them. Using these identifiers, they can be looked up by a client, subscriber, or user. In an embodiment, once a context is located, a client can use an application programming interface (API) in order to interact with the context to perform work.

In an embodiment, a context must be in one of its four states (created, active, inactive, or deleted) and a context transitions from state to state as it moves through context lifecycle 300. The states of the context lifecycle and relationships between the states, according to an embodiment of the invention, are described in the following sections.

2.1.1 Created State

The lifecycle 300 of a context begins in step 340 when a context is created. After a context is created in step 340, it enters the Created state. Context model 205 defines the number of parameter(s) that are passed to the constructor. The minimum parameters passed to step 354 include at least a unique identifier that will identify the newly created context. Other parameters can be used to set context variables 215. All context variables 215, except contextual context variables, are defined with initial values so it is not necessary to initialize them through parameters.

If the contextual variable has an association relationship, it is initialized in step 341 by looking up the designated context. This lookup of the designated context is accomplished by using an appropriate identifier for the lookup. This identifier can be passed as a parameter to constructor of the referring context. It can also be from the initial value of a context variable 215. The contextual variable is only initialized in step 341 if the referred to context is located.

In step 354, an evaluation is made regarding whether the initialization in step 341 was successful. If it is determined that the context is initialized (i.e., the context is in the initialized state), control is passed to step 342. If it is determined in step 354 that the context is not initialized, control is passed to step 356.

If the context cannot be located, it is considered to be an error and the creation will fail in step 356. However, it is not treated as an error condition if no identifier is specified to use for locating the context. The contextual variable will have a null reference and it can be subsequently set up by an administrator.

In step 356, an error is reported when the context is not initialized. In an embodiment, step 356 may include reporting a context creation error to an administrator or user who has subscribed to the context. For example, the error may be reported via a message or display on a graphical user interface.

If the contextual variable has a composition relationship, the owning context's constructor automatically creates the dependent context by invoking its constructor and passing in a GUID as identifier and other necessary parameters. The GUID is known to the parent context as it 'owns' the child or created context and controls the child context's lifecycle. The failure to create the child context will cause a creation error in step 356.

If the contextual variable is initialized successfully in step 341, it will have a reference to a context. For a vector of references, it is possible to initialize from zero to n references. A referring context will register a relationship with this initialized context. Registration allows for change events 230 to be propagated. Similarly, de-registration is be done to remove the relationship so that the referred to context can halt propagation of change events 230.

If the context is created and initialized in step 341, it will automatically transition to the Active state in step 342.

At this point, change events 230 and state events 358 are set for the active context. In this step, input events 362 are also processed for the active context. Context events such as change events 230 and state events 358 and input events 362 are described in greater detail in section 3 below. The active state is the normal operating state of the context. In this state, the context will receive and process input events 362 to update its context variables 215. In addition, the context will raise change events 230 and state events 358 to trigger subscribed consumers to perform their action. Through administrative or user actions 348, a context in the active state can be moved to the inactive state in step 344.

In step 344, the context is set to the inactive state if an administrator or user action 348 triggers a state transition from active to inactive. A context in the inactive state can be considered disabled. An inactive context will ignore all input events and as a result will not raise any change events 230. Through administrative or user action 348, a context in the inactive state can be activated, back to the Active state in step 342. Deactivating the context and putting it into the inactive state in step 344 may cause the context to be out of sync with the sources. For example, if a notification event associated with a simple variable is reporting an edge transition of some sort rather than the actual state. An inactive context will ignore many of such notification events and lose count. In an embodiment, an administrator may synchronize an inactive context in this scenario when the context is transitioned back to the active state in step 342.

A context can be destroyed or deleted from either the active or inactive state and enter into the Deleted state in step 352. According to one embodiment, context server 110 may retain or cache a deleted context for an undetermined period of time. In another embodiment, the amount of time a deleted context is retained is a tunable parameter entered by an administrator. Alternatively, context server 110 may also remove a destroyed context immediately at its discretion. A context in the Deleted state cannot be looked up.

2.2 Context Model Development

Figure 4:
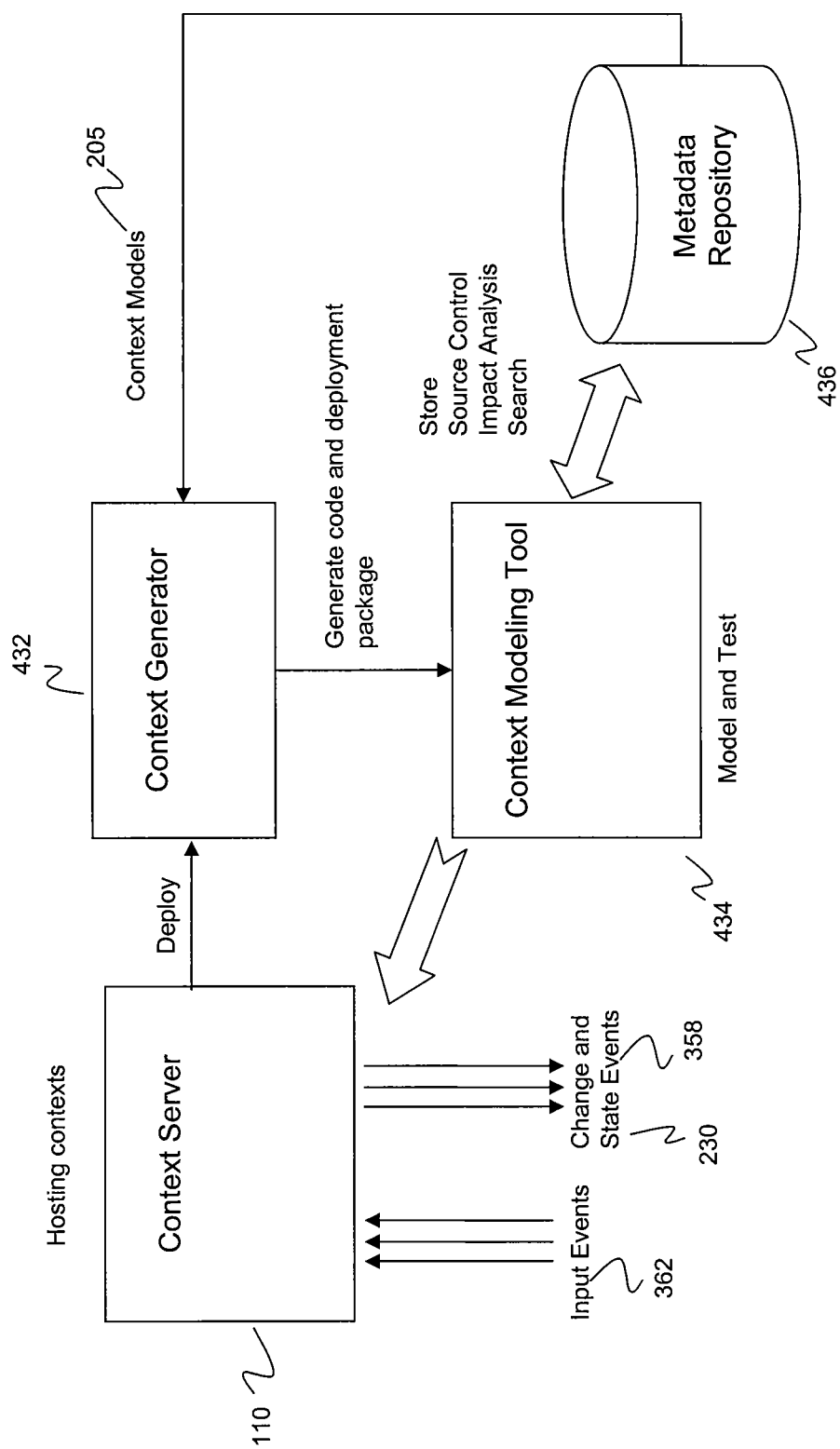
FIG. 4 illustrates a process for context model development, in accordance with an embodiment of the present invention.

FIG. 4 illustrates the process 400 for development of a context model according to an embodiment of the invention.

Context modeling refers to the development of context models 205. The relationship between context model 205 and a context is similar to the relationship between a Java class and a Java object. Context model 205 is the blueprint for a context and a context is created based upon context model 205. The first step in context-based data pre-fetching and notification is the development of an appropriate context model 205. Many different context models 205 may be required in a typical system. Context model 205 may depend on other context models. For example, the context for mobile sales personnel may refers to the context of the mobile device being used by the sales personnel combined with the context of the personnel's respective departments and the personnel's personal information manager (PIM). A mobile device's 160 context is determined by one of more of the following factors: mobile device network connectivity (voice and data network), battery level, and GPS location. A PIM context is determined by evaluating one or more of calendar, address book and other factors. A department context may be determined by evaluating sales figures, the department's commission policy, the department's sales goals, and other department-level factors. This list of variables used to determine a context is not exhaustive, but is provided as an example of variables that can be used in context model 205.

Context modeling tool 434 depicted in FIG. 4 may include a graphical user interface (GUI) module configured to accept input of modeling parameters. Context model 205 is described by appropriate metadata. Once a context model 205 is developed, context generator 432 reads in the metadata representing context model 205 and generates various support artifacts and code. The resulting output is packaged into a deployment unit and deployed into context Server 110. Once deployed, administrator and/or user can create contexts based on the deployed context model 205. Context model 205 created in step 340 described above resides within context server 110. Context server 110 is responsible for maintaining the state of context model 205. Context model maintenance includes updates to context variables 215 depicted in FIG. 2.

2.3 Context Variables

Context model 205 is the blueprint for a certain kind of context. Context model 205 includes a set of context variables 215 that define the scope of the context. The scope determines the set of situations or scenarios that the context can express. For example, a work context model can have two Boolean type variables: at-office, on-vacation. State variable contains a single value or vector of values of a particular type. Unlike simple variable, it receives no external input that may change its value(s).

Context variables 215, by default, raise a change event whenever its value/vector of values changes. There is an option, propagate-change, to control this behavior. When set to false, the variable will not raise a change event. When any one of the context variables raises a change event, the context model will also raise a change event. In order to allow the context model to control this behavior, the context model also has a propagate-change option. State variable does not raise change event, instead it raises a state event.

In addition to the set of situations of the context represented in Table 1, there are multiple types of context variables 215. Context variables 215 can have, but are not limited to, the types listed and described in Table 2 below.

TABLE 2

| Context Variable Types | |
|---|---|
| Variable Type | Description |
| Simple | Contains a single value or a vector of values of a particular type. For example can include integer values. The value(s) comes from external sources such as sensors, application states, environmental values based on location, time, speed, and other factors. |
| Derived | Contains a single value or vector of values of a particular type derived through the processing of other simple variables or derived variables within the context |
| Contextual | Contains a reference or vector of references to another context model. This allows a context model to be developed based on other context models. For example, the contextual variable is for a device context model. By allowing a vector of references, can refer at runtime to multiple device contexts. Contextual variables allow a context model to be composed of other context models (composability) |
| Aggregate | A collection of context variables of multiple types. A combination of simple, derived, and/or contextual variables. |

According to an embodiment, a Simple context variable is required to have a default or initial value. For a vector or array of values, the initial state can be an empty vector. A user can define a source for updating a simple context variable. In an embodiment, a user or administrator defines how context variables are to be updated. For example, a management graphical user interface (GUI) can be used by users or administrators to define how simple and aggregate context variables are to be updated.

In accordance with an embodiment of the present invention, a simple context variable must be associated with either a polling or notification event for it to be valid. The polling or notification event is the source for a simple context variable. A procedure may be defined to process or transform the information from the polling or notification event and update the variable.

In an embodiment, a simple context variable also has associated with it an update-frequency option. The update frequency option is a positive integer value. For example a value of 0 or 1 means that we the output of the polling/notification event reported will be examined every time to determine if a change has occurred, and a value of 4 means that the output of the event once will only be examined every four times. This mechanism allows users and administrators to use simple context variable to control how frequently changes will be reported. For example, a polling event may occur each second whereas a simple context variable may be set to a value such that a user is only interested in a resolution of 30 second increments, while other users may require much higher resolution such as each 10 seconds.

In an embodiment, simple context variables 215 can be updated through one of the methods described in Table 3 below. The supported simple context variable update methods include, but are not limited to, those listed and described in Table 3.

TABLE 3

Simple Context Variable Update Methods

| Update Method | Description |
| --- | --- |
| Polling | Requires the specification of the polling event. |
| Notification | Requires the specification of a notification event. |

In an embodiment, derived context variables are also required to have default or initial values. Once again, for a vector value, an empty vector can be the initial state. According to an embodiment, in order to update derived context variables, a specification of a procedure operating on a set of simple variables or derived variables is required. The output of the procedure returns a value or vector of values. In an embodiment, the procedure can be triggered by one of the mechanisms listed in Table 4 below, depending on the settings made by a user in a context variable 215 within the context model 205. The derived context variable procedure triggers include, but are not limited to, those listed and described in Table 4.

TABLE 4

Derived Context Variable Procedure Triggers

| Trigger Type | Description |
| --- | --- |
| On Change | Procedure is executed whenever anyone of the set of specified variables is changed (triggered by a change event, see below) This method gives the most current status of the variable |
| Periodic | Procedure is executed as determined by a schedule and frequency. This periodic method is used to avoid excessive processing load or when there is no requirement for instantaneous update |

Contextual context variables require the specification of another context model. If the variable is defined to be a vector of references, it means that more than one contexts of the specified context model 205 can be referenced. The relationship between the context models 205 involved can be of association or composition (a specialized form of association with ownership and lifecycle implications). Association or shared relationships work well in the context system because updating contexts is resource intensive. Hence, an advantage of an embodiment of the invention is that contexts can be shared.

Contexts can also be composed. Composition means there is a parent context (owner) and a child context. The child context is not shared, but is owned by the parent context. The parent context is responsible for the lifecycle of the child context.

The use of contextual variable allows a context model to be re-usable by other context models. Reusability is important for building increasingly complex models 205 using what is already developed.

2.4 State Variables

According to an embodiment of the invention, state variables are internal variables and do not have a source. Polling or notification events are not specified for state variables. However, a procedure may be defined that can change its own value or even values of other state variables as well as issuing state events such as the state events described below. A procedure can be triggered by change events 230 and state events. State variables also have initial values associated with them.

2.5 Context Model and Context

A context is an instantiation or runtime representation of context model 205 that it is created from. For example, context model 205 describes the context and is used as a template to create the actual object hosted within context server 110. A context is created with an identity or unique identifier that another context or user can use to reference or lookup the context.

3.0 Events

The context system is event-driven. According to an embodiment of the invention, there are two primary types of events: context events such as change events 230, input events 362 depicted in FIG. 3; and state events 358.

A change event triggers data selection functions and notifications. Input events are events triggered by sensors, enterprise applications, user actions, and other events that update variables within the context. Change events 230 are described in greater detail in section 3.1.1 below. A state event is raised by the specified procedure of a state variable when the context detects actionable circumstances. Thus, an event is the base upon which the context system is built. State events are discussed in section 3.2 below.

3.1 Context Events

Context events depicted in FIGS. 3 and 4 include change events 230 and state events 358 as well as input events 362. Input events 362 include polling and notification events.

3.1.1 Change Events

Change events 230 are events raised by context variables 215. Whenever a context variable changes its value or vector of values based on output of the associated input event, it raises a change event. According to an embodiment of the present invention, a change event always contains the name of the variable that raises it. The change event is propagated to the context containing the corresponding context variable and in turn, will raise a change event of its own. The change event raised will have within it the name of the variable whose change event caused the context's change event and the current value. Users can subscribe to a change to a context variable to derive useful operations and behavior from them.

3.1.2 Input Events

Figure 7:
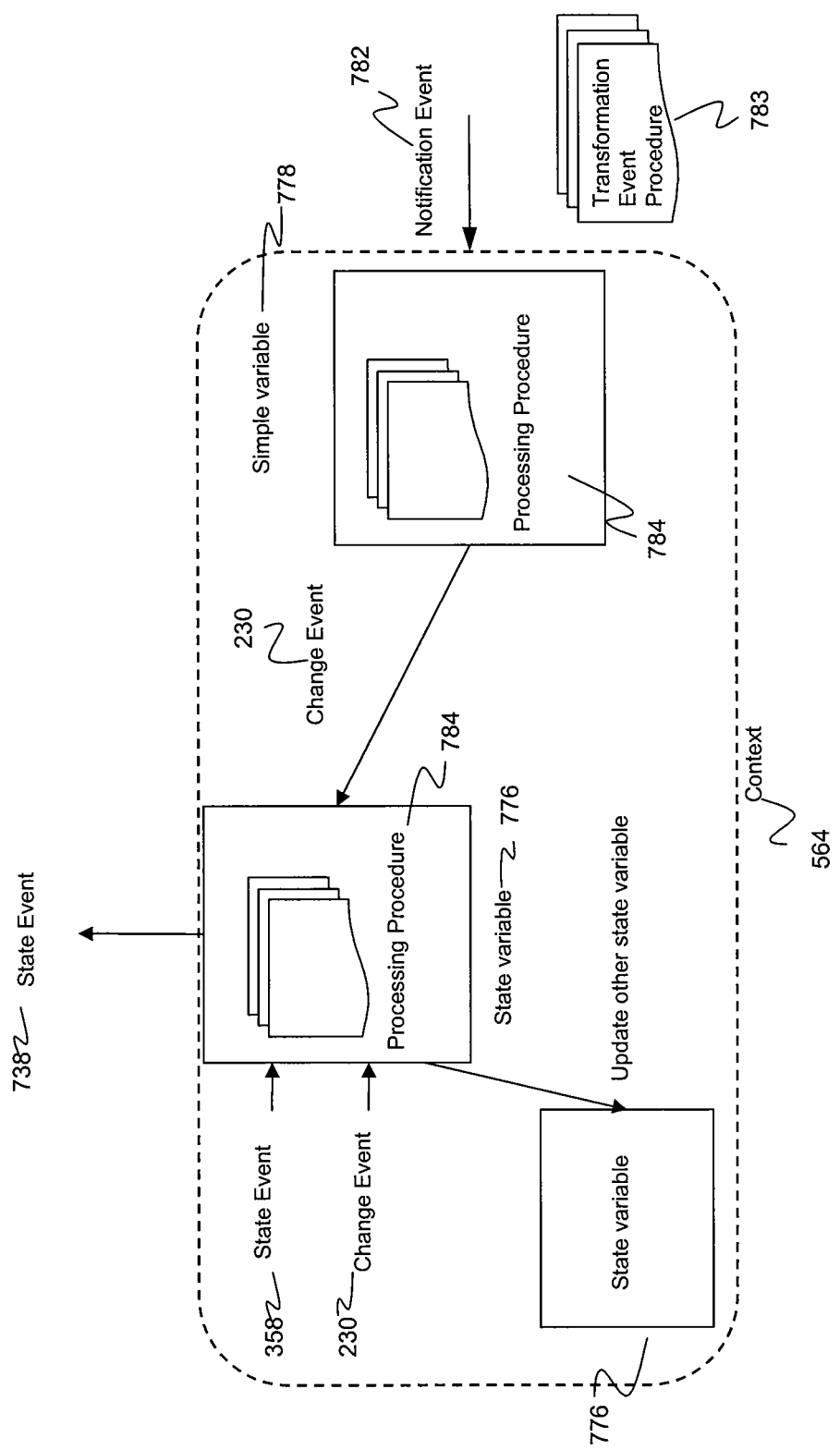
FIG. 7 illustrates data pre-fetching for mobile applications, in accordance with an embodiment of the present invention.

Input events 362 are the source of updates to simple variables and indirectly to derived variables. Output of input event is expressed in a canonical format with an associated entity that describes it. An embodiment of the invention uses XML and the XML schema to describe the output. FIG. 7 depicts the role of simple variables 778 in the pre-fetching process 700, in accordance with an embodiment of the invention. In most cases, simple variable 778 references an input event points which points to an appropriate element within the output to be the source of that variable.

Input events 362 are shared by many simple variables 778. For example, five simple variables 778 from different context models 205 can reference a single input event 362 such as a polling event. In this example, the output of the polling event upon execution is used by all five simple variables 778 to determine if their values or vectors of values need to be updated. Similarly, when a notification event is received, all simple variables 778 referencing it will examine its output for update of their values.

3.1.2.1 Polling Events

A polling event contains the instruction to poll or acquire the status of a certain entity. For example, a polling event can contain an instruction to poll for the status of a purchase order from an enterprise application. A polling event is also has schedule and polling frequency attributes. The schedule defines when the polling is to take place. According to embodiments of the invention, the schedule attribute can be configured by an administrator and can be one or more of a time of day (i.e., 9 AM-6 PM), days of the week (i.e., Monday-Friday), months of the year, or other ranges of time. The frequency attribute specifies how often the polling should occur. In accordance with embodiments of the present invention, the frequency attribute can be configured by an administrator and can be one or more of seconds (i.e., each 5 seconds), minutes, hours, days (i.e., daily or every other day), weeks (i.e., weekly or bi-weekly), or months. When the poll event is executed at the specified time, the polling results in an output. The output is expressed in a canonical format for use by simple context variables. Information acquired from data sources during polling may require some transformation to the canonical format. Polling events are executed by context server 110 according to their associated schedule.

3.1.2.2 Notification Events

Notification event 782 depicted in FIG. 7 can result from receiving a message. For example, notification event 782 can be a message from an Enterprise System Bus (ESB), a device reporting its status or other data sources capable of generating a message. The format of these messages can vary depending on the source. Hence, notification event 782 has associated with it transformation procedure 783 to help transform the received message and express the message in a canonical format. The processing procedure 784 associated with simple variable 778 takes the canonical form and performs processing to filter out and calculate what matters to it.

Transformation procedure 783 is added to notification event 782. The Processing procedure 783 associated with notification event 782 is where input of notification event 782 is transformed into a canonical form. When the message is received and transformed, notification event 782 is generated.

In accordance with an embodiment of the present invention, a method is invoked in a Web Service interface provided by the context system. The published Web Services Description Language (WSDL) will define the input message type. The entity that provides the input for context variable(s) 215 can simply call a web service interface to push it. They do not need to generate a message and send it. This is an alternate method to receive inputs for context variables 215. The output of the event is used to update simple variables 778 associated with context variables 215.

3.2 State Events

While a change event 230 notifies external listeners of changes in non-state variables, a state event 358 indicates a condition or circumstance detected by the context. State variable 776 is the container of the value for the state variable, which in turn generates stat event 358. State variable 776 is not simply a passive container to collect information that constitutes a particular type of context. Rather, state variable 776 allows context 564 to play an active role in determining actionable items based on its state. State variable 776 contains its name and its current value.

4.0 Relationships Between Contexts

In accordance with an embodiment of the present invention, contexts can have two types of relationships between them, association and composition relationships. These two relationship types are described in the sections below.

4.1 Association

Two contexts 564 based on context models 205 that have an association among them are aware of each other. It is important that a referred-to context has knowledge of a referring context so that events can be propagated to the referred to context. The act of initializing a contextual variable with an association relationship at creation time involves the referring context looking up the referred-to context and registering with the referred-to context. If the referring context is deleted or otherwise goes away, it deregisters with the referred to context so that the relationship can be severed. The referring context does not own the referred-to context. For example, a many-to-one relationship can exist between referring contexts and a referred-to context. When a context 564 based on a context model 205 with a contextual variable is created, it will attempt to look up the referred-to context. If the referred-to cannot be found, the context 564 is considered not initialized and creation will fail as a result as depicted in step 356 of FIG. 3. The creation of the referred-to context should occur independently.

4.2 Composition

Composition implies ownership or a parent-child relationship. The lifecycle of a child context is the responsibility of the parent context. A contextual variable with a composition relationship usually means that the child context is not to be shared and private to the parent context. This is usually done to allow the parent context to 'fine-tune' the behavior of the child context for the parent's own use. For a shared context in an association relationship, each context in the relationship sees the same events. In this way, there are implications when updating many contexts based on a similar set of input events.

4.3 Context Application Programming Interface (API)

In accordance with an embodiment, a set of APIs for manipulation of contexts is defined as part of a system. In embodiments, the context API can be generic or dynamic. The context API can be used to work on contexts from any context model 205. As a result, it is not as efficient as model specific API. A client can use the API to look up any context based on a unique context identifier. The API can also be used to obtain information about the context model 205 that the context is based upon. By using the API and the information obtained via calls to the API, any context can be manipulated.

5.0 Context Model Development

Context 564 is a first class citizen within the system. Thus, a rigorous approach for context development is employed through context modeling. In an embodiment of the invention, a context modeling tool is used as part of a system to create and maintain context models.

5.1 Context Modeling

FIG. 4 depicts the steps and components involved in the context modeling process 400, in accordance with an embodiment of the invention. According to an embodiment of the invention, context modeling tool 434 is used during the development of context model 205. Context modeling tool 434 expresses context model 205 using metadata. The developed context model 205 is stored within metadata repository 436. In embodiments, metadata repository 436 may be a relational database or a data store. The use of metadata repository 436 allows developers to store and maintain multiple versions of context models 205 and perform impact analysis if a particular context is to be modified or removed. This is important as context models 205 are often based on other context models 205. Without the ability to understand how a change to a particular context model 205 can impact other context models, maintenance of these context models is very difficult.

Metadata repository 436 allows developers to support source control and configuration management for context models 205. Source control and configuration management enables collaboration among developers, including teams of developers who are not collocated. Metadata repository 436 also allows developers to search for suitable context models 205 for reuse with a powerful query language. In an embodiment of the invention, the query language is fashioned after and similar to the structured query language (SQL).

The context modeling process 400 includes developing input events 362 that feed context models 205 with updates. Development of these input events requires knowledge of data sources, including both hardware and software data sources. The acquisition of input events 362 involves interfacing with data sources to retrieve/receive information. It may require transformation of information to a canonical representation. Input events 362 are developed once and shared by all context variables 215 interested in the events. In other words, input events 362 are reused in the development of new context models 205. Hence, in an embodiment, all developed input events 362 are also stored within metadata repository 436. The benefits of impact analysis, source control, and collaboration also apply to input events 362.

6.0 Data Pre-Fetching Using a Context

Figure 5:
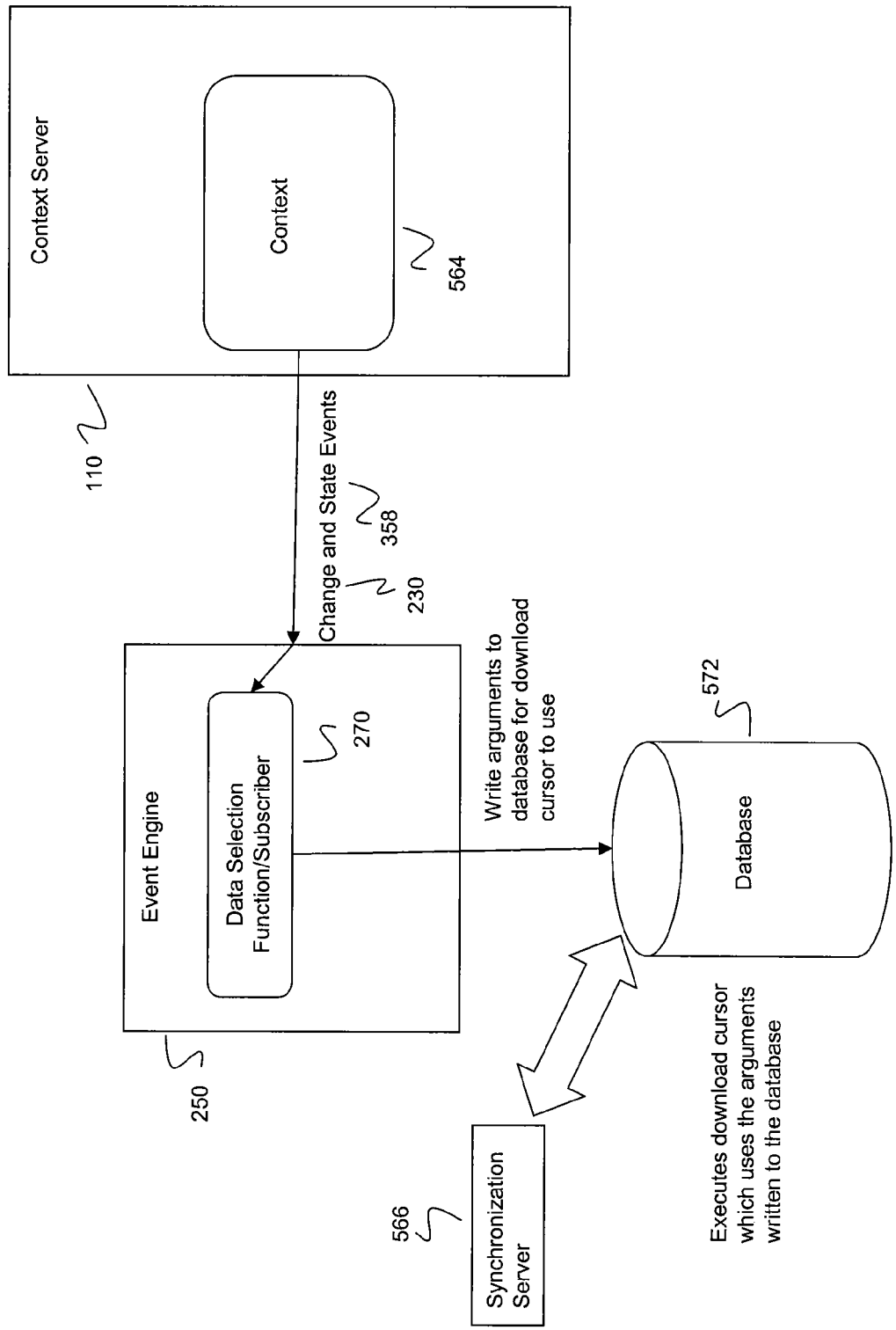
FIG. 5 illustrates a context data selection function implemented as a download cursor within a database, in accordance with an embodiment of the present invention.
Figure 6:
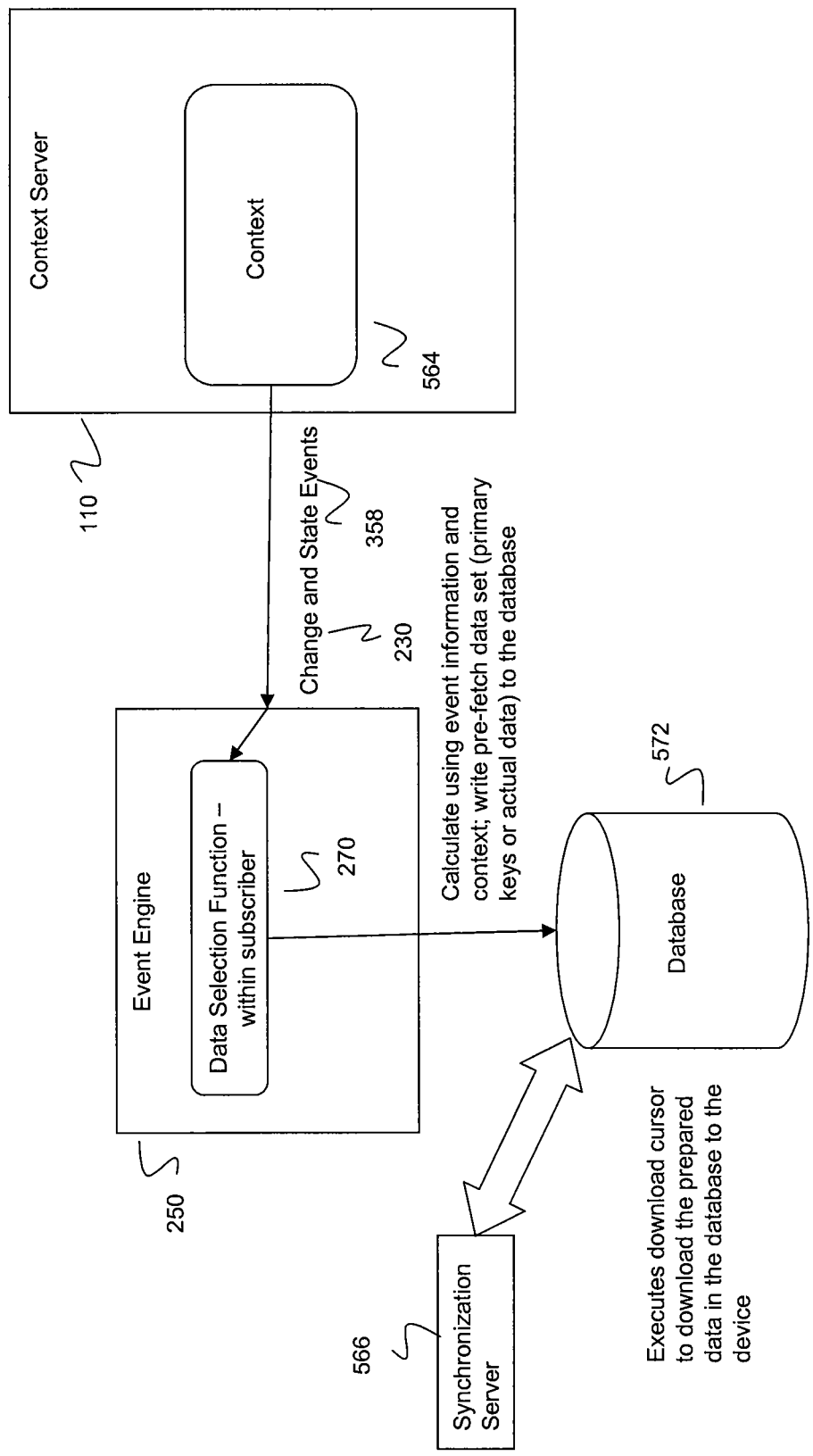
FIG. 6 illustrates a data selection function implemented within a subscriber, in accordance with an embodiment of the present invention.

FIGS. 5 and 6 illustrate how data pre-fetching is performed by a data selection function 270, in accordance with embodiments of the invention. These embodiments are described in the sections below.

6.1 Data Pre-Fetching Mechanism

The method used by data selection function 270 to indicate the set of data to be pre-fetched for a particular mobile user/device combination 295 depends on the synchronization mechanism between the mobile device 160 and the enterprise server 122 depicted in FIG. 1. Data selection function 270 is triggered by either a change or state event such as change events 230 and state events 358. Change events 230 and state events 358 are generated from context 564 through a subscription. In other words, context 564 drives data selection function 270 which then interrogates context 564 to determine the situation and to come up the proper dataset. In the embodiment illustrated in FIG. 5, data selection function 270 within a data selection subscriber writes arguments to database 572 for use by a download cursor. In one embodiment, data selection function 270 within a data selection subscriber writes arguments to database 572 for use by a MobiLink download cursor. As would be appreciated by those skilled in the relevant art(s), database 572 can be a relational database or a staging database for a data repository, a data store, a data warehouse, or any other structured collection of records or data.

6.2 Context Driven by Subscription

FIG. 6 depicts data selection function 270 implemented within a subscriber, in accordance with an embodiment of the present invention. As shown in FIG. 6, context 564 is an independent entity; which can constantly change based on input events which trigger context 564 to emit change events 230 and state events 358. Context 564 does not maintain a tight coupling with its consumers. Instead, it is the consumers that take action and indicate an interest in a particular set of context variables 215 within context 554. In an embodiment, consumers accomplish this by registering a subscription 220 with a particular context model 205 specifying the set of context variables 215 and state variables within context model 564 to subscribe to. Context variables 215 can be conceptualized as change events and state variables are related to state events. State events and state variables are described in greater detail below with reference to FIG. 7. Events raised by the set of context variables 215 will trigger the consumers. Subscriptions allow the consumers to 'fine-tune' their interest in a particular context model 205. At runtime, this means that all contexts 564 based on a particular context model 205 are eligible for triggering their respective subscribers via subscriptions 220. For example, if data selection function 270 is subscribed to a mobile device 160 context model 205 and there are five mobile device contexts 564 in the active state within context server 110, any one of the five contexts 564 can trigger data selection function 270.

6.3 Data Selection Functions

Data selection functions 270 are more than consumers of context events 230. They also take advantage of context 554's set of context variables 215. In an embodiment, once triggered, data selection function 270 will use a context API as well as generated code for context model 205 that data selection function 270 is subscribed to. Data selection function 270 retrieves information from the triggering event to look up context 554 within context server 110. Data selection function 270 can then use generated code to determine that 'state' of context 554 in addition to the state that fires the change/state event. Besides the information in context 554, data selection function 270 may use other state information elsewhere to arrive at the appropriate dataset.

What data selection function 270 takes advantage of once triggered is dependent on the function itself and the mobile application running on mobile devices 160 that the function may be associated with. In some cases, the event is the most important element, while in other situations; it is the event and the rest of context 554 that matters. The following sections describe methods to determine what data selection function 270 takes advantage when the function is triggered.

6.3.1 Trigger Only Method for Data Selection

In the trigger-only method, data selection function 270 does not access the firing context 564. According to this method, data selection function 270 has access to a triggering event that contains a current value of a context variable 215, which is the contributor to the event.

In an embodiment, a current value of context variable 215 can be a Global Positioning System (GPS) location to calculate what the set of pre-fetch data is comprised of. In more complicated cases, data selection function 270 subscribes to a state event which is more than just a change, but is the output of a state machine. This means that the triggering condition for the function can be non-trivial and yet data selection function 270 does not require a lot of contextual information to arrive at the set of pre-fetch data.

6.3.2 Context-Based Method for Data Selection

Data selection function 270 has access to the firing context 564. In this manner, data selection function 270 is able to examine context 564 and based on the values of all the context's context variables 215 to determine the set of pre-fetch data. The 'trigger only' method described in the previous section is a subset of the context-based method. According to an embodiment, data selection function 270 accesses context 564 through its API rather than being given a copy.

This ensures that data selection function 270 will always see the latest context variables 215 within context 564.

6.3.3 Other Information Selected by Data Selection Functions

Data selection function 270 may also refer to external information stored within an enterprise such as information stored on enterprise server 122 in order to arrive at the set of pre-fetch data. For various reasons, whether it is difficult to develop an input event or other technical issues, this information may be determined to be inappropriate for inclusion in context 564.

According to an embodiment, it is possible to have data selection functions 270 using the 'trigger only' and 'context based' methods to leverage other information.

6.3.4 Types of Data Selection Functions

Data selection function 270 can be implemented as required by the application. Data selection function 270 can be procedural or inferential. In an embodiment of this invention, there are two ways of implementing data selection function 270. The first example embodiment is depicted in FIG. 5 and uses a download cursor within a relational database synchronization occurring on synchronization server 566. In one embodiment, the download cursor may occur as part of a MobiLink relational database synchronization occurring on a MobiLink server. In the embodiment depicted in FIG. 5, the download cursor is defined as a structured query language (SQL) procedure or statement executed on synchronization server 566. The information from the triggering event and/or context 564 is used as parameters or arguments to the download cursor. In this embodiment, data selection function 270 is the combination of the data selection subscriber that writes the arguments to database 572 and a download cursor that selects the appropriate set of data using the arguments written by the subscriber. For more complicated scenario, a data selection subscriber can be a procedure, a set of rules that obtain information from the triggering event, and/or context 564 that generates a new set of values for use by the download cursor as arguments.

The data selection subscriber subscribes to the events 230 and state events 358 of context 564. The data selection subscriber is paired with a download cursor to select the set of pre-fetch data. The subscriber knows what arguments the download cursor expects and takes advantage of information in the triggering event and/or context 564 to come up with the set of values.

A second example embodiment of how data selection function 270 can be implemented is depicted in FIG. 6. In this embodiment, data selection function 270 is within the subscriber and uses information from the triggering event as well as the firing context 564 (or other information) to calculate the set of pre-fetch data. Data selection function 270 then writes the pre-fetch data either in the form of a set of primary keys or the actual data to database 572. The pre-defined download cursor will pick up the pre-fetch data from database 572 and download it to mobile device 160. This embodiment is a more flexible method to calculate the pre-fetch data as data selection function can 270 employ more than a SQL statement/procedure that executes against synchronization server 566.

In both of these example embodiments of data selection function 270; the pre-fetch data is delivered to mobile device 160 via a pull mechanism. For example, a trigger is sent to mobile device 160 which causes the device to perform database synchronization. In an embodiment, this method works best under the following three scenarios.

1. The pre-fetch dataset is relatively large and it is therefore more efficient to do a relational database synchronization.

2. There is a need to avoid overwriting modified data on mobile device 160 by giving the device an opportunity to upload its modified information back to enterprise server 122 before receiving the pre-fetch data. This is because in relational database synchronization, there is usually an option to perform an upload of changes from mobile device 160 before doing a download to the device. In this scenario, data selection function 270 will create a set of primary keys that refer to the data to be pre-fetched. After the upload, the download cursor uses the set of primary keys to assemble the data for download. By now, it will include records modified during the upload.

3. A relational data store is the appropriate storage container on mobile device 160. This scenario may exist when mobile device 160 has sufficient processing capacity, memory, and storage capacity to enable a relational data store to reside on the device.

Despite the three scenarios described above, alternative embodiments of the invention may perform a true data push to mobile device 160 instead of a poke-pull or push-pull method. A data push method is most appropriate when the amount of pre-fetch data is relatively small and the database synchronization workload for database 572 is relatively large or heavy. In order to implement the data push method, an agent is needed on mobile device 160 to take the pre-fetch data and update the local database resident on the device. In addition, if the local data store on mobile device 160 is not a relational database, it will make more sense to actually push the pre-fetch data to the device.

7.0 Data Pre-Fetching Process

FIG. 7 illustrates the data pre-fetching process 700, according to an embodiment of the invention. In data pre-fetching, there can also be a data store (not depicted in FIG. 7) on the platform where the pre-fetched data is received. In an embodiment, the platform where the pre-fetched data is received is a mobile device 160 belonging to a user.

The mobile device and user combination 295 depicted in FIG. 2 is what determines the set of pre-fetched data selected by data selection functions 270. Mobile device 160 may not be able store all the data that is required by the user due to security reasons or resource constraints of the device. The data pre-fetching process 700 attempts to remedy this situation by using context 564 to determine what data is likely to be required ahead of time. This determination is not an open ended prediction, but it is likely that the context 564 required in order to make the determination can be extremely large and may involve complex calculations. Therefore, it is important that the use case be constrained through use of context model 205 and an appropriately defined data selection function 270. In an embodiment, data selection functions 270 and the context model 205 the function subscribes to is the implementation of the solution to the problem of predicting the data need for a particular mobile device/user combination 295.

In accordance with embodiments of the present invention, two methods for data pre-fetching are supported: stateful and stateless. These methods are described below.

7.1 Stateless Context Based Data Pre-Fetching

The stateless method is performed without requiring that context 564 or data selection function 270 maintain a state regarding what a given mobile device 160 has in its data store. As a result, some portion of the pre-fetch data may overlap with what is already stored on mobile device 160. This data redundancy results in lower efficiency due to performing a pre-fetch of data that mobile device 160 already has. Usually, the stateless model is employed for use cases where chances of data overlap or duplication are relatively low. For example, if pre-fetching is performed for customer data based on the calendar (i.e., date, day of week) and time, it is unlikely that pre-fetch process 700 will push the same customer over to the same mobile device 160 within the same day. It is very possible that the process will purge the record on mobile device 160 after each work day due to security concerns (i.e., data privacy, database rights) or resource limitation of the device.

7.2 Stateful Context Based Data Pre-Fetching

The stateful method is performed by keeping information regarding the set of data, the state, on mobile device 160 either within context 564 or in some state container elsewhere. According to an embodiment, the state container may be a database table such as a relational database table in database 572. This state is used to trim the dataset to avoid sending data that already exists on mobile device 160. If the state is kept within context 564, an input event is needed to keep the state up to date. In an embodiment, notification event 782 is used to accomplish this.

7.2.1 Maintaining a Client's Dataset Status Within a Context

In accordance with embodiments of the invention, are two ways that a client's dataset status can be maintained or kept in context 564. This can be accomplished by use of state variable 776 combined with receiving change event 230 from simple variable 778. In an alternative embodiment, this can be accomplished solely through use of simple variable 778. In either of these embodiments, an input event for simple variable 778 is used to notify context 564 of changes in the client's dataset status. In an embodiment, if the client side data store is non-relational, data pre-fetch process 700 is accomplished by sending explicit Create, Update, and Delete commands from the client, and in situations where data inconsistencies are possible, a Replace command is sent with the complete state to synchronize again. The Update command's purpose is to let data selection function 270 to either override or skip notification of modified data on mobile device 160.

There is additional flexibility when state variable 776 is used to maintain the state. Compared with simple variable 778, state variable 776 can receive other events such as state events 358 and change events 230. State variable 776 can also offer multiple update streams as needed.

7.2.2 Maintaining a Client's Dataset Status Outside of a Context

If the client has relational data store resident on it and relational database synchronization is being used, it is oftentimes easier to keep the state in a database table on the server side. According to an embodiment of the invention, a synchronization server 566 as depicted in FIGS. 5 and 6 may be used for the relational database synchronization. SYBASE™ MobiLink is an example of a currently available synchronization server. In one embodiment, synchronization server 566 may be a MobiLink server. In an embodiment, the database table on the server side may also be part of database 572. The relational synchronization engine can directly update the table without going through context 564. However, data selection function 270 must access the state from the table rather than context 564. For relational synchronization, this is an advantageous way to implement data selection functions 270.

This method of keeping a client's dataset status can also be used in non-relational database synchronization scenarios. In general, if data synchronization can take advantage of the state in an efficient way, it is better to maintain a client's dataset status using the most suitable method (i.e., either within or outside of context 564, depending on the factors described above).

8.0 Notification Using a Context

FIG. 8 illustrates the notification generation process 800, according to an embodiment of the present invention. The steps of notification generation process 800 are described in the sections below.

8.1 Notification Types

In accordance with an embodiment of the present invention, there are two types of notifications: actionable 887 and informational 888. Actionable notifications 887 gives users the ability to take actions defined within the notification. In addition, actionable notification 887 includes data to support the action. For example, if actionable notification 887 is for an urgent purchase order approval request, the notification carries with it data needed to approve the purchase order. The action in this example is to either approve or deny the purchase order and the data comprises the actual purchase order. An information notification 888 is just for reference and the recipient of the notification cannot act upon it. An example of an information notification 888 is an approved purchase order notification. In this example, there is no action to be carried out as the purchase order was previously approved.

In both types of notification, the data within the notification is read only and cannot be modified. Instead, for actionable notifications 887, a service call can be invoked with appropriate parameters. The service call clearly defines the granularity and interface for interaction with an actionable notification 887.

The medium of executing an actionable context 564 can vary. According to an embodiment of the invention, there are two mechanisms to execute an actionable context 564. The mechanisms include, but are not limited to, those listed and described in Table 5 below.

TABLE 5

Actionable Context Mechanisms

| Mechanism | Description |
| --- | --- |
| Email | Use an email container such as the Sybase Mobile Office Email container on the client side to interpret an XML document that represents the notification. |
| Offline web page | Use a server application such as the Sybase Mobile Business Anywhere server to push web page(s) to the mobile device. The data is contained within the web page(s). The web pages contain controls needed to execute a service invocation. |

8.2 Notification Generation

Notifications are triggered by events from contexts 564. However, context 564 does not generate the notification. Instead, context 564 signals that a condition has been met and a subscriber should determine if it is appropriate to generate a notification such as an actionable notification 887 or an informational notification 888.

Within the event engine 250, notification generation function 886 subscribes to change events 230 and state events 358 in context 564. Notification generation function 886 is triggered when the change events 230 and state events 358 are fired and notification generation function 886 then determines whether a notification such as an actionable notification 887 or an informational notification 888 needs to be generated.

8.2.1 Stateless Notification Generation

The stateless class of notifications is generated based on current conditions, information from the triggering change event 230 or state event 358 and the firing context 564. Additionally, the notification can use other information available in the enterprise (i.e., available from enterprise server 122). A state does not need to be kept for this type of generated notification. As a result, the notification generation function 886 can be comprised of a set of rules using the information mentioned above to determine whether a notification is appropriate. In an alternative embodiment, a notification generation function 886 can be implemented as a procedure written in a particular programming language such as Java or C#.

8.2.2 Stateful Notification Generation

A simple stateful case involves the use of state information kept and maintained by an external entity. In this case, the notification generation function 886 simply accesses the external state and in conjunction with the information from the change event 230 or state event 358 and context 564 determines whether to generate a notification such as actionable notification 887 or informational notification 888. In accordance with an embodiment of the invention, a different method using context 564 itself is employed. This method essentially calls for using context 564 to implement a state machine. This is done through state variables 776 and their processing procedures 784. The context variables 215 serve as inputs to the state machine, triggering state transition. State events 358 serve as the output of the state machine and are used to trigger a notification generation function 886 to execute. Since context 564 can be associated with another context, there is the ability to link up multiple state machines to help determine if a notification should be generated. This is a very powerful concept as multiple types of contexts 564 can cooperate together to arrive at a very sophisticated condition and thereby increase the accuracy of the notification. The state machine within the context 564 takes advantage of the event driven environment to perform state transition and generate outputs. Given the context variables 215 within context 564 have input events 362; the creation of the state machine is greatly simplified.

9. Context Modeling Flow

FIG. 9 is a flowchart 900 illustrating steps by which context modeling is performed, in accordance with an embodiment of the present invention.

More particularly, flowchart 900 illustrates the steps involved in the development of a context model 205 using context modeling tool 434 described above and depicted in FIG. 4. Flowchart 900 is described with reference to the embodiments of FIGS. 1-5 and 7. However, flowchart 900 is not limited to those example embodiments. Note that the steps in the flowchart do not necessarily have to occur in the order shown.

The method begins at step 937 wherein the scope of the context model 205 to be developed is determined. In this step, the scope of a context model 205 is determined by answering a series of questions. In an embodiment, prior to developing context model 205, a series of determinations are made, including determining: what situation that the context model will describe; what context variables 215 represent the situation to be represented by context model 205; what input events 362 will be the source of context variables 205; what changes to context variables 215 are of interest for consumers of context 554; what, if any, are the possible state events 358 for context 554; what, if any, context models 205 may be re-used; and what are the relationships between reused context models. After the scope of context model 205 is determined, control is passed to step 939.

In step 939, context modeling tool 434 is opened and input events 362 are created. In this step, polling events are defined by specifying the polling procedure that will retrieve/acquire status from one or more data sources. The schedule and frequency of the polling are also configured in step 939. In this step, context modeling tool 434 is also used to specify the transformation procedure, if needed, to convert the output of the polling procedure to a canonical form. This conversion may be done by the processing procedure 784 associated with the event. The event provides information needed to convert the output of the polling procedure to a canonical form so the transformation procedure does not need to be specified for each consumer. However, each consumer can determine how to take advantage of the notification presented to them in canonical form. The consumers may do further transformation and processing to create a form that is useful to them. After input events 362 are created, control is passed to step 941.

In step 941, notification events 782 are defined. In this step, the message format that will be received is specified along with the transformation procedure, if needed. The transformation procedure is a processing procedure 784 that converts notification events 782 from: received messages to canonical form; and from input messages of a Web Service call invoked by a data source to a canonical form. After notification events 782 are defined, control is passed to step 947.

In step 947, context modeling tool 434 is used to test input events 362 to ensure that input events 362 yield the data expected. During this step, context modeling tool 434 deploys the developed input events to a test context server 110 as depicted in FIG. 4. In this step, polling events can be tested by triggering a corresponding poll procedure. For notification events 782, the context modeling tool 434 will provide a way to generate notification messages for testing. In an embodiment, context modeling tool 434 also provides a way to receive actual messages if they are available.

In step 949, an evaluation is made regarding whether input events 362 yield the expected data based on the testing in step 947. If it is determined that input events 362 yielded the expected data, control is passed to step 340. If it is determined in step 949 that input events 362 did not yield the expected data, control is passed back to step 941 in order to modify input events 362 until they generate expected data.

In step 340, a new context model 205 is created. As described above with reference to FIG. 3, creation of context model 205 involves adding context variables 215 to context 554 in step 951. Context variables 215 created in step 951 are not sharable and cannot be reused across multiple context models 205. After context model 205 is created, control is passed to step 951.

In step 951, simple variables are established and added to context model 205 that was created in step 340. In this step, it is determined if a single value or a vector of values is needed for simple variables. In step 951, a search for input events 362 is conducted and the appropriate input events 362, including polling and notification events 782, are selected to associate with context model 205. If no suitable input events 362 are found, a new input event 362 is created in this step and associated with context model 205. In step 951, initial value(s) for simple variables are also set in addition to specifying whether a 230 change event should be raised by a given simple variable. In this step, the update-frequency option, if needed, is also established for simple variables. According to an embodiment, by a default of value of zero is set for simple variables.

In step 951, derived variables are also established for the context model 205 created in step 340. This is accomplished by determining if a single value or a vector of values is needed, specifying initial value(s) for the derived variables, and specifying the set of simple or derived variables that will be used by the derived variables. If it determined in this step that a new simple variable is needed and not available, the simple variable establishment process described in the preceding paragraph is repeated. In this step, a processing procedure 784 is specified that takes advantage of all selected context variables 215 to calculate the value or vector of values for the derived variables. In an embodiment of the invention, this is accomplished by specifying if processing procedure 784 is to be executed an 'On Change' or 'Periodic' basis. For the 'Periodic' basis or setting, schedule and frequency values are set using context modeling tool 434. In this step, context modeling tool 434 is also used to specify whether a change event 230 should be raised by derived variables.

In step 951, contextual variables are also established for context model 205 created in step 340. Contextual variables are established by searching for a suitable context model using context modeling tool 434, determining if a single reference or a vector of references for context model 205 is needed, specifying if an association or composition relationship is needed, and specifying whether change event 230 should be raised by the contextual variable. If an association relationship is needed and the reference to the relationship is to be resolved during creation, step 951 includes specifying the source of the identifier used to perform the association lookup. In an embodiment, the source of the identifier is either a constructor parameter or a variable. If a composition relationship is needed and the reference to the relationship is to be resolved during creation, this step includes indicating the parameters to use for calling the constructor of the child context. In accordance with an embodiment, this may require the specification of a constructor other than the default constructor. If needed, a custom constructor is specified to take care of creating child contexts and other initializations.

In step 951, state variables 776 are also established for the context model. State variables 776 are established in this step by determining if a value or vector of values is required, specifying initial value(s), and specifying processing procedure 784 that may update state variables 776. According to an embodiment of the present invention, processing procedure 784 may raise state events 358 also. Establishment of state variables 776 further includes specifying a set of simple, derived or state variables that will trigger processing procedure 784 to execute, if there is a processing procedure 784 configured to update state variable 776. For simple and derived variables, a change event 230 is the trigger, but for a state variable 776, it is state event 358. After context variables are established and added to context model 205, control is passed to step 953.

In step 953, a constructor is defined for context model 205. In an embodiment, a default constructor is generated by context modeling tool 434 if there is no requirement for a default constructor. In this step a minimum of one parameter is specified for defined constructor defined that serves as the identifier for the created context. In step 953, parameter(s) are added to the constructor as required. These parameters can be used to initialize context variables 215 such as the simple, derived, and state variables 776 established in step 951 by using context modeling tool 434 to link the parameters to the variables. For example, a parameter can be used in the following ways by using context modeling tool 434 to link the parameter to the contextual variable. If there is an association relationship, the parameter can be used as the identifier to lookup the referred-to context. If there is a composition relationship the parameter is a parameter for the constructor of the child context.

In step 953, context modeling tool 434 can also generate a default constructor. However, if custom initialization is subsequently required, this must be specified using the default constructor generated in this step as a template. After constructor is defined, control is passed to step 955.

In step 955, the options for the context model 205 are specified. This is accomplished by determining if context model 205 should raise a change event 230, and then the process continues in step 957.

In step 957, context model 205 is tested by using context modeling tool 434 to generate input events 362. Input events 362 were already tested in step 947, so the goal in step 957 is to ascertain how input events 362 will affect the behavior of context 554. As with input event testing in step 947, in this step modeling tool 434 deploys context model 205 to a test context server 110 and the process continues in step 959.

In step 959, after context model 205 has been developed, context generator 432 reads in metadata representing context model 205 and generates support artifacts and code. In an embodiment of the invention, the support artifacts and code are output as a generated deployment package as depicted in FIG. 4. For example, the resulting output can be packaged into a deployment unit. In an embodiment, the deployment unit can be dataset 290 depicted in FIG. 2. Generated code allows a client written in various programming languages to access and manipulate context 554. According to embodiments of the invention, the generated code is written in Java or C#.

Code generated in step 959 is based on context model 205 and is specific to that model. This code allows the client to efficiently manipulate the associated context. The client does not have to make an initial determination as to what set of context variables 215 and their types are. In an embodiment, there are procedures that set and retrieve each variable that the client can invoke. In this embodiment, it is assumed that the client knows context model 205 and what context variables 215 are within the context model. According to an embodiment, a context API similar to Java's Reflection API is used to execute code generated in step 959. In an alternative embodiment, a Java object is generated in step 959 that has all of its methods defined by the Java class. The client will use the code generated in step 959 for context model 205 to perform its work.

10. Example Computer System Implementation

Various aspects of the present invention can be implemented by software, firmware, hardware, or a combination thereof. FIG. 10 illustrates an example computer system 1000 in which the present invention, or portions thereof, can be implemented as computer-readable code. For example, the method illustrated by flowchart 900 of FIG. 9 can be implemented in system 1000. Various embodiments of the invention are described in terms of this example computer system 1000. After reading this description, it will become apparent to a person skilled in the relevant art how to implement the invention using other computer systems and/or computer architectures.

Computer system 1000 includes one or more processors, such as processor 1004. Processor 1004 can be a special purpose or a general purpose processor. Processor 1004 is connected to a communication infrastructure 1006 (for example, a bus, or network).

Computer system 1000 also includes a main memory 1008, preferably random access memory (RAM), and may also include a secondary memory 1010. Secondary memory 1010 may include, for example, a hard disk drive 1012, a removable storage drive 1014, flash memory, a memory stick, and/or any similar non-volatile storage mechanism. Removable storage drive 1014 may comprise a floppy disk drive, a magnetic tape drive, an optical disk drive, a flash memory, or the like. The removable storage drive 1014 reads from and/or writes to a removable storage unit 1015 in a well known manner. Removable storage unit 1015 may comprise a floppy disk, magnetic tape, optical disk, etc. which is read by and written to by removable storage drive 1014. As will be appreciated by persons skilled in the relevant art(s), removable storage unit 1015 includes a computer usable storage medium having stored therein computer software and/or data.

In alternative implementations, secondary memory 1010 may include other similar means for allowing computer programs or other instructions to be loaded into computer system 1000. Such means may include, for example, a removable storage unit 1022 and an interface 1020. Examples of such means may include a program cartridge and cartridge interface (such as that found in video game devices), a removable memory chip (such as an EPROM, or PROM) and associated socket, and other removable storage units 1022 and interfaces 1020 which allow software and data to be transferred from the removable storage unit 1022 to computer system 1000.

Computer system 1000 may also include a communications interface 1024. Communications interface 1024 allows software and data to be transferred between computer system 1000 and external devices. Communications interface 1024 may include a modem, a network interface (such as an Ethernet card), a communications port, a PCMCIA slot and card, or the like. Software and data transferred via communications interface 1024 are in the form of signals which may be electronic, electromagnetic, optical, or other signals capable of being received by communications interface 1024. These signals are provided to communications interface 1024 via a communications path 1026. Communications path 1026 carries signals and may be implemented using wire or cable, fiber optics, a phone line, a cellular phone link, an RF link or other communications channels.

In this document, the terms 'computer program medium' and 'computer usable medium' are used to generally refer to media such as removable storage unit 1015, removable storage unit 1022, and a hard disk installed in hard disk drive 1012. Signals carried over communications path 1026 can also embody the logic described herein. Computer program medium and computer usable medium can also refer to memories, such as main memory 1008 and secondary memory 1010, which can be memory semiconductors (e.g. DRAMs, etc.). These computer program products are means for providing software to computer system 1000.

Computer programs (also called computer control logic) are stored in main memory 1008 and/or secondary memory 1010. Computer programs may also be received via communications interface 1024. Such computer programs, when executed, enable computer system 1000 to implement the present invention as discussed herein. In particular, the computer programs, when executed, enable processor 1004 to implement the processes of the present invention, such as the steps in the methods illustrated by flowchart 900 of FIG. 9 discussed above. Accordingly, such computer programs represent controllers of the computer system 1000. Where the invention is implemented using software, the software may be stored in a computer program product and loaded into computer system 1000 using removable storage drive 1014, interface 1020, hard drive 1012, or communications interface 1024.

The invention is also directed to computer program products comprising software stored on any computer useable medium. Such software, when executed in one or more data processing device, causes a data processing device(s) to operate as described herein. Embodiments of the invention employ any computer useable or readable medium, known now or in the future. Examples of computer useable mediums include, but are not limited to, primary storage devices (e.g., any type of random access memory), secondary storage devices (e.g., hard drives, floppy disks, CD ROMS, ZIP disks, tapes, magnetic storage devices, optical storage devices, MEMS, nanotechnological storage device, etc.), and communication mediums (e.g., wired and wireless communications networks, local area networks, wide area networks, intranets, etc.).

11. Conclusion

While various embodiments of the present invention have been described above, it should be understood that they have been presented by way of example only, and not limitation. It will be understood by those skilled in the relevant art(s) that various changes in form and details may be made therein without departing from the spirit and scope of the invention as defined in the appended claims. For example, in the above embodiments and description, the invention has been described with reference to particular examples, such as PDAs, Pocket PCs, Blackberry® devices, mobile phones, laptop computers, etc. It should be understood that the invention is not limited to these examples. The invention is applicable to any elements operating as described herein. Accordingly, the breadth and scope of the present invention should not be limited by any of the above-described exemplary embodiments, but should be defined only in accordance with the following claims and their equivalents.

What is claimed is:

1. A computer-implemented method for context-based data pre-fetching for an application, the method comprising:

creating a context model that defines a domain of situational information associated with an application, wherein the context model comprises one or more context variables and context events, and wherein each of the context variables is associated with an update frequency that controls how frequently chances in the context variables occur;

populating one or more of the context variables within the context model based on a state of the application;

instantiating a context for a specific mobile device and its user, based on the context model, to monitor one or more aspects of the situational information for the specific mobile device and its user;

determining whether the instantiated context is active or inactive;

subscribing to the context events of the instantiated context, wherein the context events are associated with changes in the context variables corresponding to the situational information for the specific mobile device and its user, upon a determination that the instantiated context is active;

identifying a likely set of data needed by the application based on values of one or more of the context variables and the context events of the instantiated context; and executing a data selection function to generate a dataset for the application, based on the identified likely set of data needed by the application, wherein the dataset is unmodifiable by the application.

2. The method of claim 1, wherein the context events comprise notification events, input events, and state events.

3. The method of claim 1, further comprising:
executing a notification creation function to generate a notification for the application, wherein the notification comprises at least a non-modifiable dataset and associated metadata describing data contained within the non-modifiable dataset.

4. The method of claim 3, wherein the notification further comprises a variable indicating whether the notification is actionable or informational.

5. The method of claim 3, wherein executing the notification creation function further comprises packaging the notification with metadata that assists with display of data contained within the non-modifiable dataset, and wherein the packaging is performed by the application.

6. The method of claim 1, wherein the populating step further comprises populating at least one of the context variables with values representing situational information of the application.

7. The method of claim 6, wherein the situational information includes information about at least one user using the application.

8. The method of claim 1, wherein the context model is shared by multiple applications executing on one or more computational devices.

9. The method of claim 8, wherein the one or more computational devices include one or more mobile devices.

10. The method of claim 9, wherein the situational information includes information about the one or more mobile devices executing the application.

11. The method of claim 1, wherein the executing step further comprises packaging the dataset with metadata describing data contained within the dataset.

12. The method of claim 11, wherein the executing step further comprises packaging, by the application, the dataset with metadata that assists with display of data contained within the dataset.

13. The method of claim 1, wherein the executing step further comprises including at least a unique identifier in the dataset.

14. The method of claim 13, wherein the executing step further comprises including at least a timestamp, a dataset name, and a dataset version in the unique identifier in the dataset.

15. The method of claim 1, wherein the executing step further comprises including structured and unstructured data in the dataset.

16. The method of claim 9, wherein each of the one or more mobile devices includes at least a client side container configured to interpret the dataset.

17. The method of claim 16, wherein the client side container displays the dataset in a manner appropriate for the application.

18. The method of claim 16, wherein the client side container is aware of an environment that the application is executing within.

19. The method of claim 18, wherein the environment includes characteristics of at least one of the one or more mobile devices executing the application.

20. The method of claim 18, wherein the client side container can render data within the dataset in a fashion that is most suitable for a mobile device executing the application.

21. The method of claim 8, further comprising:
acknowledging the dataset generated during the executing step on the one or more computational devices.

22. The method of claim 8, further comprising:
discarding the dataset, on the one or more computational devices after a predetermined time.

23. The method of claim 22, wherein the predetermined time is based on a policy on the one or more computational devices.

24. The method of claim 8, wherein users of the one or more computational devices subscribe to the one or more context variables.

25. The method of claim 1, wherein the dataset can be reviewed and deleted by a user of the application.

26. A system configured to perform context-based data pre-fetching and notification for an application, comprising:
a context modeling module configured to create and maintain a context model that defines a domain of situational information associated with an application, wherein the context model comprises at least one or more context variables and context events, and wherein each of the context variables is associated with an update frequency that controls how frequently changes in the context variables occur;
a context variable module configured to populate and update one or more of the context variables within the context model based on a state of the application;
a data selection module configured to determine a dataset for the application, wherein the determination is based on values of one or more of the context variables and the context events of at least one instantiated context that is based on the context model, and wherein the dataset is unmodifiable by the application when the application;
an inference module configured to maintain an inference engine used by the data selection module to identify a likely set of data needed by the application;
an event engine module configured to subscribe to the context events of the instantiated context, wherein the context events are associated with changes in the context variables corresponding to the situational information for the specific mobile device and its user; and
a notification module configured to generate a notification for the application, wherein the notification comprises at least a non-modifiable dataset and associated metadata describing data contained within the non-modifiable dataset
wherein at least one of the modules is implemented using one or more computer processors.

27. The system of claim 26, wherein the notification module is further configured to populate a variable indicating whether the notification is actionable or informational.

28. The system of claim 26, wherein the notification module is further configured to package the notification with metadata that assists with display of data contained within the notification.

29. A computer readable storage device having instructions stored thereon, execution of which, by a processor, causes the processor to perform operations for context-based data pre-fetching and notification for an application, the operations comprising:
creating and maintaining a context model that defines a domain of situational information associated with an application, wherein the context model comprises one or more context variables and context events, and wherein each of the context variables is associated with an update frequency that controls how frequently changes in the context values occur;
populating and updating one or more of the context variables within the context model based on a state of the application;

instantiating a context for a specific mobile device and its user, based on the context model, to monitor one or more aspects of the situational information for the specific mobile device and its user;

subscribing to the context events of the instantiated context, wherein the context events are associated with changes in the context variables corresponding to the situational information for the specific mobile device and its user, upon a determination that the instantiated context is active;

determining a dataset for the application, wherein the determining is based on values of at least one of the context variables and the context events of the instantiated context, wherein the dataset is unmodifiable by the application; and maintaining an inference engine used by the determining step to arrive at a likely set of data needed by the application based on values of at least one context variable of the instantiated context.

30. The computer readable storage device of claim 29, the operations further comprising:

executing a notification creation function to generate a notification for the application, wherein the notification comprises at least a non-modifiable dataset and associated metadata describing data contained within the non-modifiable dataset.

31. The computer readable storage device of claim 30, wherein the notification further comprises a variable indicating whether the notification is actionable or informational.

32. The computer readable storage device of claim 30, wherein executing the notification creation function further comprises packaging the notification with metadata that assists with display of data contained within the non-modifiable dataset, and wherein the packaging is performed by the application.

* * * * *